US012694374B2

(12) United States Patent
Fayard et al.

(10) Patent No.: US 12,694,374 B2
(45) Date of Patent: Jul. 28, 2026

(54) ENTERPRISE REAL-TIME ABSENCE INFORMATION PORTAL

(71) Applicant: HARTFORD FIRE INSURANCE COMPANY, Hartford, CT (US)

(72) Inventors: Darren Michael Fayard, Tonganoxie, KS (US); Laura Lirio, Rocky Hill, CT (US); Dennis D. Pannella, Jr., Oxford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 243 days.

(21) Appl. No.: 18/467,010

(22) Filed: Sep. 14, 2023

(65) Prior Publication Data

US 2025/0094932 A1     Mar. 20, 2025

(51) Int. Cl.
*G06Q 10/1091* (2023.01)
*G06Q 10/0635* (2023.01)

(52) U.S. Cl.
CPC ..... *G06Q 10/1091* (2013.01); *G06Q 10/0635* (2013.01)

(58) Field of Classification Search
CPC . G06Q 10/1091; G06Q 10/0635; G06Q 40/08
See application file for complete search history.

(56) References Cited

U.S. PATENT DOCUMENTS

| | | |
|---|---|---|
| 7,184,962 B2 | 2/2007 | Kalnas et al. |
| 8,639,634 B2 | 1/2014 | Nelson et al. |
| 8,775,307 B2 | 7/2014 | McLaughlin et al. |
| 11,093,902 B2 | 8/2021 | Smith |
| 2008/0254421 A1* | 10/2008 | Warren ................ G09B 19/00 |
| | | 434/236 |
| 2014/0114873 A1 | 4/2014 | Contacos et al. |
| 2014/0114874 A1 | 4/2014 | Nelson et al. |
| 2016/0314253 A1* | 10/2016 | Incze .................... G06Q 40/08 |
| 2020/0342414 A1* | 10/2020 | Smith ................ G06Q 30/018 |
| 2021/0374682 A1 | 12/2021 | Smith |
| 2022/0270068 A1* | 8/2022 | Brown ................. G06Q 20/24 |
| 2024/0330817 A1* | 10/2024 | Whitehead ............ G06Q 40/08 |

OTHER PUBLICATIONS

Tamela Ferguson, The Case for Total Absence Management and Integrated Benefits, 2001, pp. 36-46, Human Resource Planning, vol. 24, Issue 3 (Year: 2001).*

* cited by examiner

*Primary Examiner* — Aaron Tutor
(74) *Attorney, Agent, or Firm* — Buckley, Maschoff & Talwalkar LLC

(57) ABSTRACT

An absence data store contains electronic records associated with absence identifiers. For each absence identifier, the data store includes an employee identifier, an absence type, and absence parameters. An employee data store contains electronic records for accounts having risk relationships with an enterprise. A back-end application computer server may associate a selected absence identifier in the absence data store with an account having a risk relationship with the enterprise. The computer server may then retrieve absence parameters from the absence data store and risk relationship parameters from the employee data store and aggregate absence parameters associated with a plurality of absence types for the selected employee identifier. The computer server may also facilitate an exchange of data with a remote device to support interactive user interface displays that include information about the aggregated absence parameters.

21 Claims, 25 Drawing Sheets

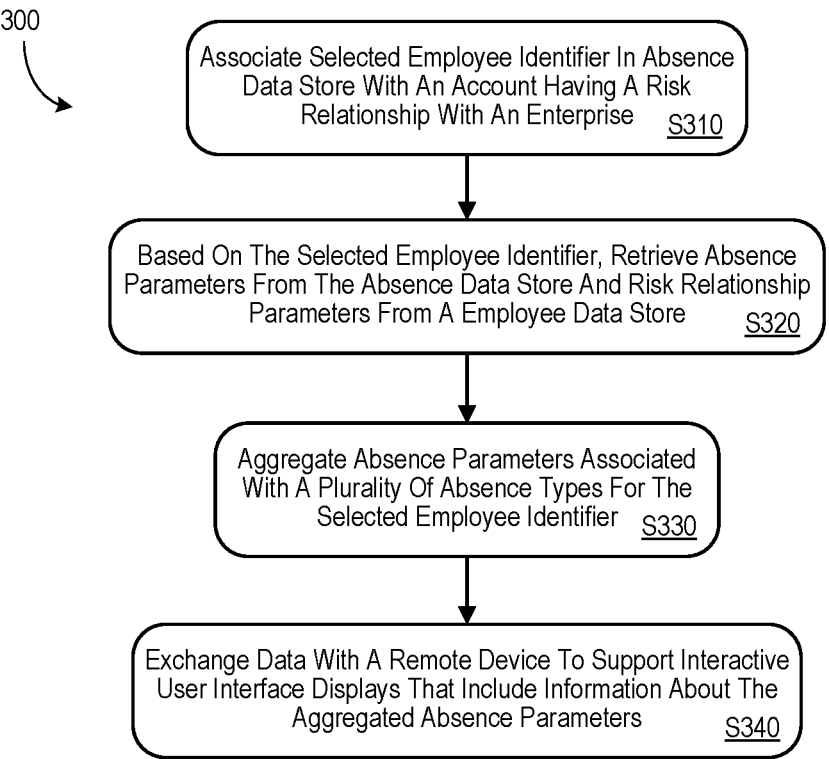

300

Associate Selected Employee Identifier In Absence Data Store With An Account Having A Risk Relationship With An Enterprise     S310

Based On The Selected Employee Identifier, Retrieve Absence Parameters From The Absence Data Store And Risk Relationship Parameters From A Employee Data Store     S320

Aggregate Absence Parameters Associated With A Plurality Of Absence Types For The Selected Employee Identifier     S330

Exchange Data With A Remote Device To Support Interactive User Interface Displays That Include Information About The Aggregated Absence Parameters     S340

*FIG. 3*

| ABSENCE ID 2402 | EMPLOYER ID 2404 | EMPLOYEE ID 2406 | DESCRIPTION 2408 | DATES 2410 |
|---|---|---|---|---|
| A_10001 | ER_101 | EE_101 | FMLA | 10/1/2026-10/5/2026 |
| A_10002 | ER_101 | EE_101 | LTD | 10/6/2026-10/9/2026 |
| A_10003 | ER_101 | EE_102 | ADA | 10/2/2026-10/4/2026 |
| A_10004 | ER_101 | EE_103 | STD | 10/11/2026-10/11/2026 |

| STATUS 2412 |
|---|
| APPROVED |
| PENDING |
| CLOSED |
| DENIED |

ENTERPRISE REAL-TIME ABSENCE INFORMATION PORTAL

TECHNICAL FIELD

The present application generally relates to computer systems and more particularly to computer systems that are adapted to accurately, securely, and/or automatically track employee absences for an enterprise.

BACKGROUND

An enterprise may enter into relationships with various parties. For example, an insurer might enter into risk relationships (e.g., insurance agreements) with various accounts, businesses, or employers. In some cases, insurance agreements may be associated with employees of a business. For example, an insurer may process Short Term Disability ("STD") or paid family leave requests for employees. It may therefore be desirable to track the employee absences and/or gain insights about potential problems or improvements. Traditionally, an employer might get this information by piecing together various reports (some of which may not be up-to-date). Once an employer gets a sense of the high-level absence situation, it may then need to delve into details for specific individuals. Today, this requires a mix of online and offline activities that involve much more than a few simple clicks.

It would be desirable to provide improved systems and methods to accurately and/or automatically provide an employee absence portal for an enterprise or employer. Moreover, the results should be easy to access, understand, interpret, update, etc.

SUMMARY OF THE INVENTION

According to some embodiments, systems, methods, apparatus, computer program code and means are provided to accurately and/or automatically provide an employee absence portal for an enterprise in a way that provides fast, secure, and useful results and that allows for flexibility and effectiveness when responding to those results.

Some embodiments are directed to an absence portal implemented via a back-end application computer server. An absence data store contains electronic records associated with absence identifiers. For each absence identifier, the data store includes an employee identifier, an absence type, and absence parameters. An employee data store contains electronic records for accounts having risk relationships with an enterprise. A back-end application computer server may associate a selected absence identifier in the absence data store with an account having a risk relationship with the enterprise. The computer server may then retrieve absence parameters from the absence data store and risk relationship parameters from the employee data store and aggregate absence parameters associated with a plurality of absence types for the selected employee identifier. The computer server may also facilitate an exchange of data with a remote device to support interactive user interface displays that include information about the aggregated absence parameters.

Some embodiments comprise: means for associating, by a computer processor of a back-end application computer server, a selected employee identifier in an absence data store with an account having a risk relationship with the enterprise, wherein the absence data store contains electronic records associated with a plurality of absence identifiers, and, for each absence identifier, an employee identifier, an absence type, and absence parameters; based on the selected employee identifier, means for retrieving absence parameters from the absence data store and risk relationship parameters from an employee data store, wherein the employee data store contains electronic records associated with a plurality of accounts having risk relationships with the enterprise, and, for each account, employee identifiers and risk relationship parameters; means for aggregating absence parameters associated with a plurality of absence types for the selected employee identifier; and means for exchanging data with a remote device to support interactive user interface displays that include information about the aggregated absence parameters.

In some embodiments, a communication device associated with a back-end application computer server exchanges information with remote devices in connection with interactive graphical user interfaces. The information may be exchanged, for example, via public and/or proprietary communication networks.

A technical effect of some embodiments of the invention is an improved and computerized absence portal for an enterprise that provides fast, secure, and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 3 illustrates a high-level method according to some embodiments.

FIG. 24 is a portion of a tabular absence data store according to some embodiments.

DETAILED DESCRIPTION

Figure 1:
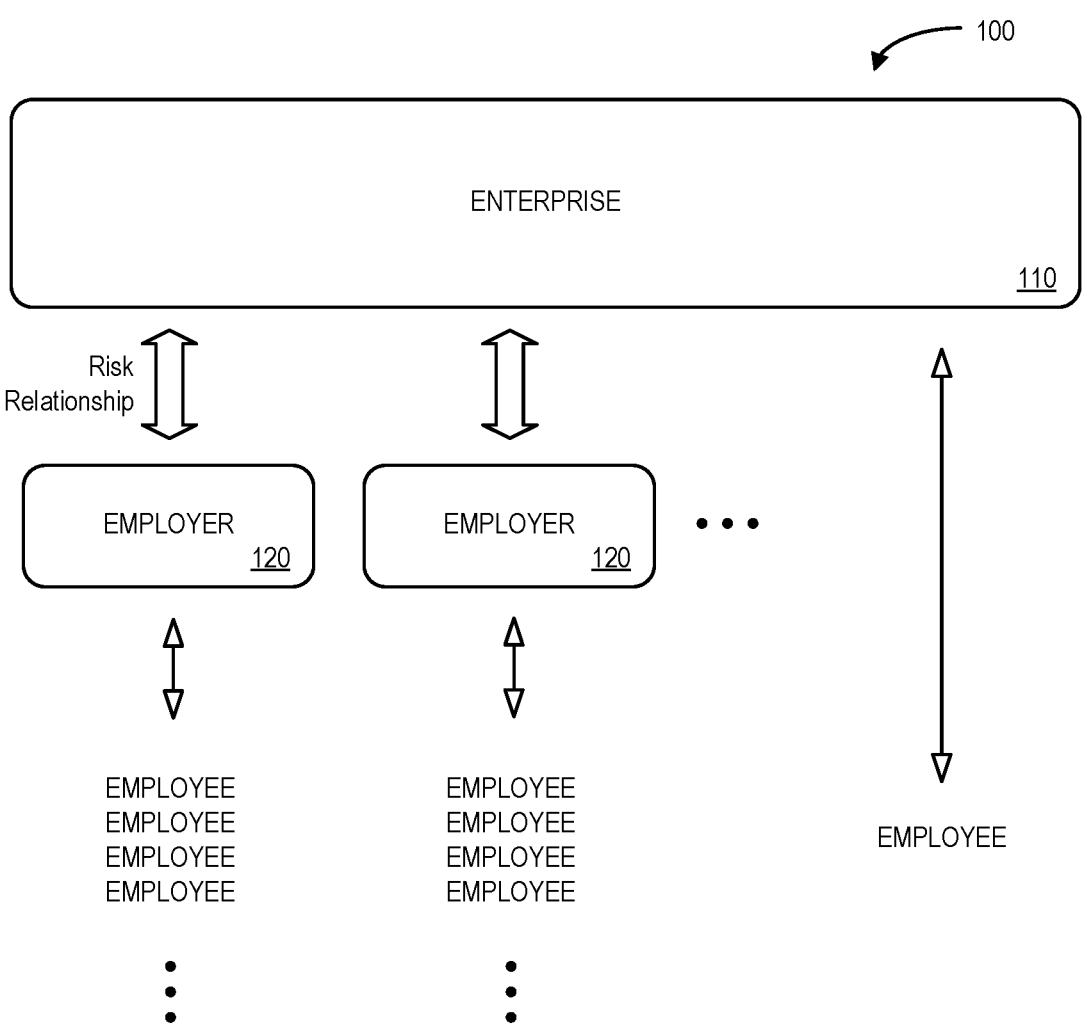
FIG. 1 shows various enterprise risk relationships according to some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data processing associated with risk relationships. The present invention is directed to more than merely a computer implementation of a routine or conventional activity previously known in the industry as it provides a specific advancement in the area of electronic record analysis by providing improvements in the operation of a computer system that aggregates information about absences in connection with risk relationships (including those associated with insurance absences). The present invention provides improvement beyond a mere generic computer implementation as it involves the novel ordered combination of system elements and processes to provide improvements in the speed, security, and accuracy of an absence portal for an enterprise. Some embodiments of the present invention are directed to a system adapted to automatically customize and execute absence information, aggregate data from multiple data sources, automatically optimize absence information to reduce unnecessary messages or communications, etc. (e.g., to consolidate or coordinate information). Moreover, communication links and messages may be automatically established, aggregated, formatted, modified, removed, exchanged, etc. to improve network performance (e.g., by reducing an amount of network messaging bandwidth and/or storage required to create generate absence messages or alerts, improve security, reduce the size of an absence data store, more efficiently collect employee absence details, etc.).

FIG. 1 shows various enterprise risk relationships 100 according to some embodiments. In particular, an enterprise 110, such as an insurance company, may have risk relationships (e.g., insurance agreements or policies) associated with employer accounts 120 (such as business). For example, an insurance company may handle family medical leave and STD requests for a business. Each employer account 120 might be associated with one or more entities (e.g., various employees). In cases, the enterprise 110 might interact directly with employees.

Figure 2:
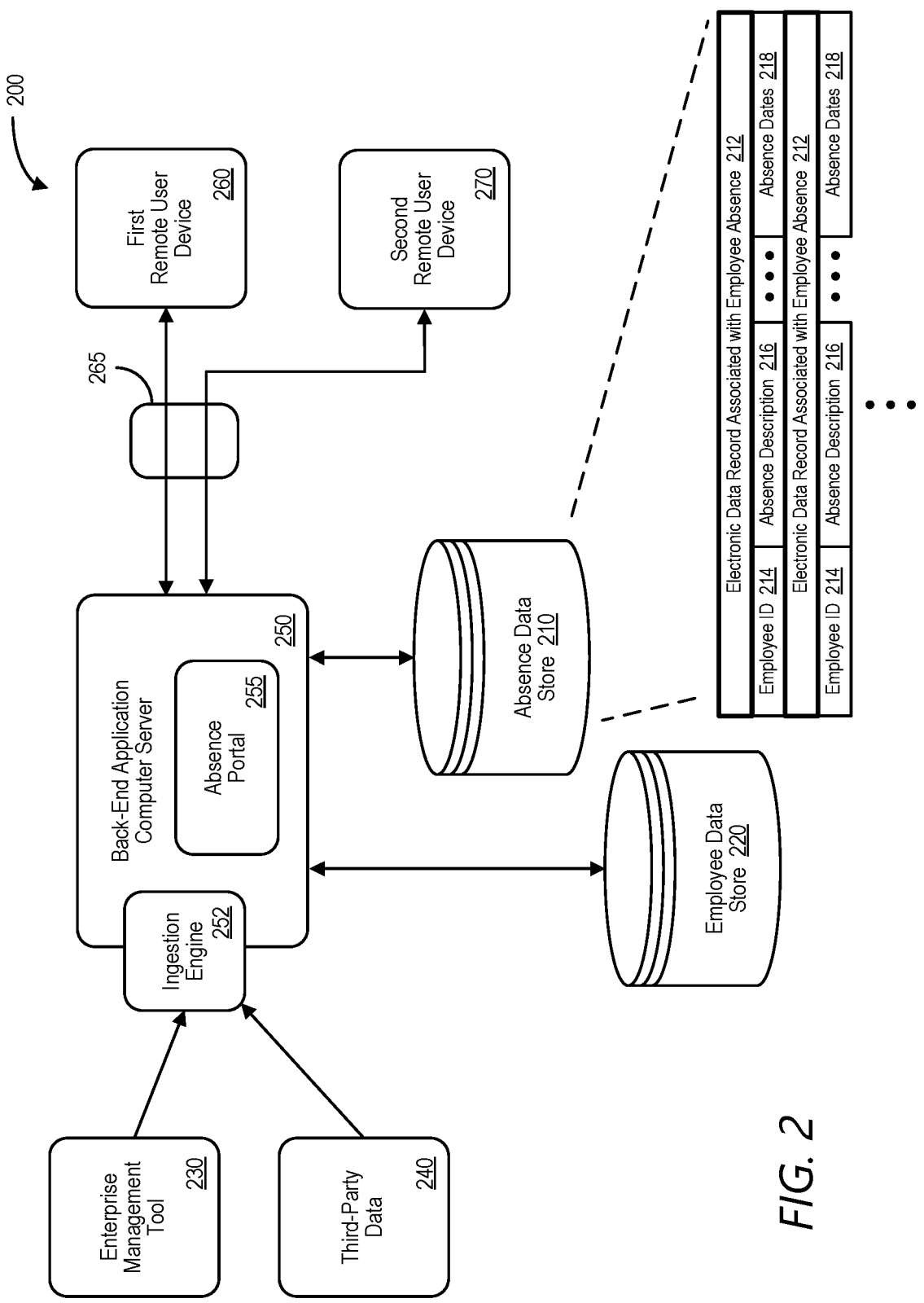
FIG. 2 is a high-level block diagram of an absence tracking system in accordance with some embodiments.

FIG. 2 is a high-level block diagram of an absence tracking system 200 that may be provided according to some embodiments of the present invention. In particular, the system 200 includes a back-end application computer server 250 that may access information in an absence data store 210 (e.g., storing a set of electronic records associated with various employee absences 212, each record including, for example, one or more employee identifiers 214, absence descriptions 216, absence dates 218, etc.). The back-end application computer server 250 may also store information into other data stores, such as an employee data store 220

(e.g., storing employee names, dates of birth, salary information, etc.), and utilize an ingestion engine 252 and absence portal 255 to aggregate, exchange, and process messages (e.g., an enterprise management tool and third-party data) and view, analyze, and/or update the electronic records. The back-end application computer server 250 may also exchange information with a first remote user device 260 and a second remote user device 270 (e.g., via a firewall 265). According to some embodiments, an interactive graphical user interface platform of the back-end application computer server 250 may facilitate absence summaries, reports, recommendations, alerts, and/or the display information via one or more remote administrator computers (e.g., to set up information mapping parameters) and/or the remote user devices 260, 270. For example, the first remote user device 260 may transmit annotated and/or updated information to the back-end application computer server 250 (e.g., updating an employee absence). Based on the updated information, the back-end application computer server 250 may adjust data in the absence data store 210 and/or the employee data store 220 and the change may (or may not) be used in connection with the second remote user device 270 (e.g., depending on whether the two users are associated with the same employer). Note that the back-end application computer server 250 and/or any of the other devices and methods described herein might be associated with a third party, such as a vendor that performs a service for an enterprise.

The back-end application computer server 250 and/or the other elements of the system 200 might be, for example, associated with a Personal Computer ("PC"), laptop computer, smartphone, an enterprise server, a server farm, and/or a database or similar storage devices. According to some embodiments, an "automated" back-end application computer server 250 (and/or other elements of the system 200) may facilitate the automated access and/or update of electronic records in the data stores 210, 220 and/or the tracking of employee absences. As used herein, the term "automated" may refer to, for example, actions that can be performed with little (or no) intervention by a human.

Devices, including those associated with the back-end application computer server 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 250 may store information into and/or retrieve information from the absence data store 210 and/or the employee data store 220. The data stores 210, 220 may be locally stored or reside remote from the back-end application computer server 250. As will be described further below, the absence data store 210 may be used by the back-end application computer server 250 in connection with an interactive user interface to access and update electronic records. Although a single back-end application computer server 250 is shown in FIG. 2, any number of such devices may be included. Moreover, various devices described herein might be combined according to embodiments of the present invention. For example, in some embodiments, the back-end application computer server 250 and absence data store 210 might be co-located and/or may comprise a single apparatus.

The elements of the system 200 may work together to perform the various embodiments of the present invention. Note that the system 200 of FIG. 2 is provided only as an example, and embodiments may be associated with additional elements or components. According to some embodiments, the elements of the system 200 automatically transmit information associated with an interactive user interface display over a distributed communication network. FIG. 3 illustrates a method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a back-end application computer server may associate a selected employee identifier in an absence data store with an account having a risk relationship with the enterprise. The absence data store may, for example, contain electronic records associated with a plurality of absence identifiers, and, for each absence identifier, an employee identifier, an absence type, and absence parameters. In some embodiments, the enterprise is an insurer, the accounts are associated with businesses, and the risk relationships are associated with insurance policies. Note that the enterprise identifier might be associated with a particular business, a Social Security Number ("SSN"), or any other information that can be used to uniquely identify a specific employee.

The absence type might indicate, for example, if an absence is associated with Short Term Disability ("STD"), Long Term Disability ("LTD"), paid family leave, etc. Moreover, the absence parameters may include an absence status indicating if an absence is approved, pending, denied, closed, etc. Other examples of absence parameters might include, for example, absence dates, an employee name, an employee gender, a date of birth, a date of hire, an employee status, an expected return to work date, an intake method, a work state, a date reported, a date of disability, a modified duty flag, a percent of benefit used value, etc.

Based on the selected employee identifier, absence parameters are retrieved from the absence data store at S320 along with risk relationship parameters from an employee data store. The employee data store may for example, contain electronic records associated with a plurality of accounts having risk relationships with the enterprise, and, for each account, employee identifiers and risk relationship parameters. At S330, the system may aggregate absence parameters associated with a plurality of absence types for the selected employee identifier. According to some embodiments, the system may further aggregate absence parameters associated with a plurality of employee identifiers.

At S340, the computer server exchanges data with a remote device to support interactive user interface displays that include information about the aggregated absence parameters. The interactive user interface displays might include, according to some embodiments, an absence portal dashboard, an absence overview, absence filters, a return to work overview, a new claim overview, a claims denied overview, etc. In some embodiments, the interactive user interface displays include an employee view, an employee intermittent absence view, an employee continuous absence view, etc.

In some embodiments, the absence parameters include a communication address and the back-end application computer server is further to automatically create and transmit a notification to the communication address. The communication address might be associated with, for example, an email address, a telephone number, a user name and password, a postal address, etc.

Figure 4:
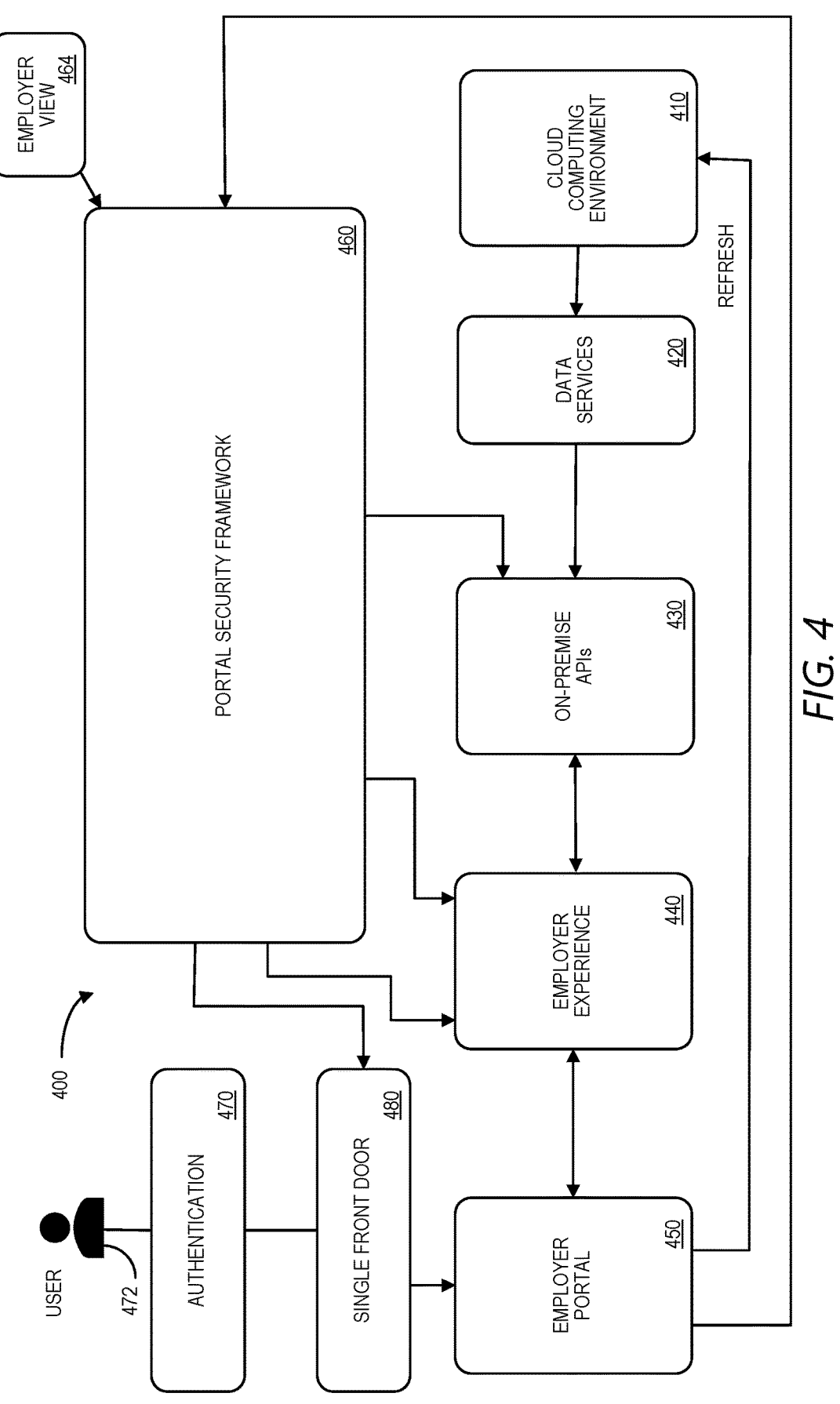
FIG. 4 is a solution architecture for a cloud-based absence tracking system in accordance with some embodiments.

FIG. 4 is a solution architecture for a cloud-based absence tracking system 400 in accordance with some embodiments. A cloud computing environment 410 may process absence information and transmit results to data services 420. The data services 420 may update an employer experience platform 440 via on-premise Application Programming Interfaces ("APIs") 430. This information may be used, along with data from a portal security framework 460 (controlled via an employer view platform 464), to generate an employer portal 450. A user 472 may access the employer portal 450 via an authentication process 470 and a single front door 480 (e.g., to handle authorizations, registrations, direction management, etc.).

Figure 5:
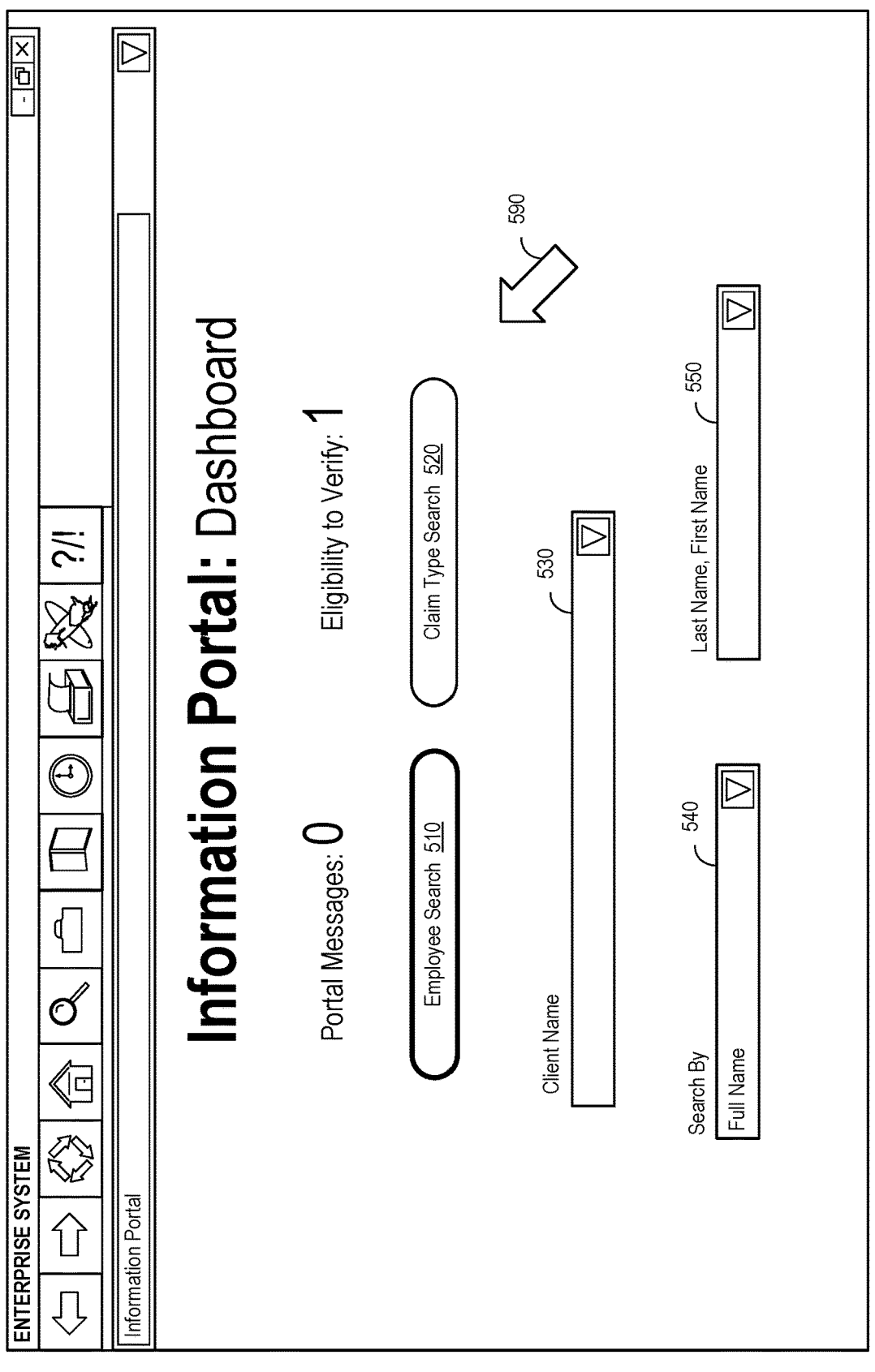
FIG. 5 is an information portal dashboard display according to some embodiments.

FIG. 5 is an information portal dashboard display 500 according to some embodiments. The dashboard display 500 may be used to perform an employee search 510 and/or claim type search 520. It can also be used to enter a client name 530, a "search by" criteria 540, and a data entry area 550 to provide text. Some or all of the options might be selectable via a touchscreen or computer mouse pointer 590 and/or drop-down menus. In some embodiments, the dashboard display may further include links to other documents, instructional tutorials, etc.

Figure 6:
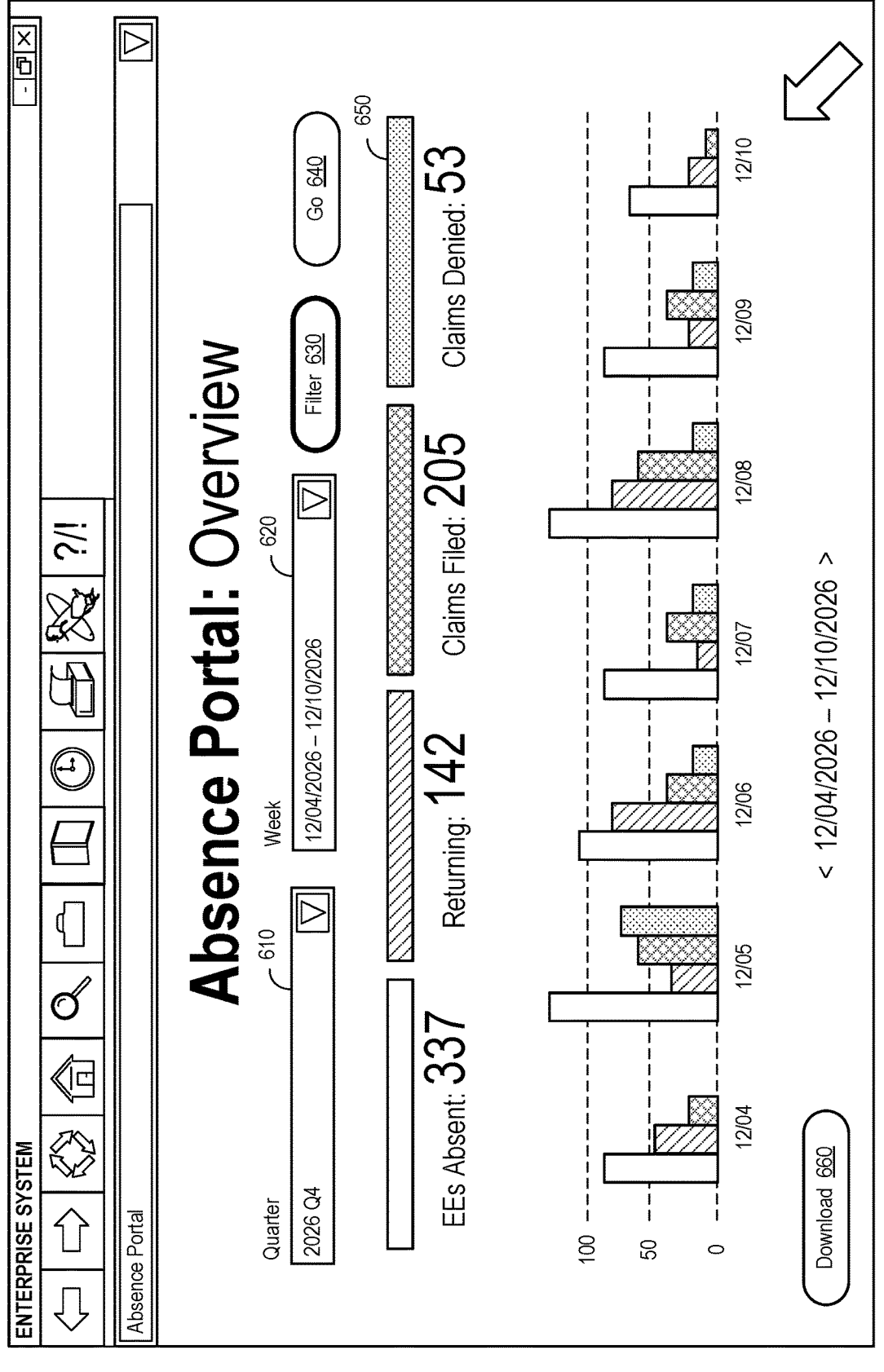
FIG. 6 is an absence portal overview display in accordance with some embodiments.
Figure 7:
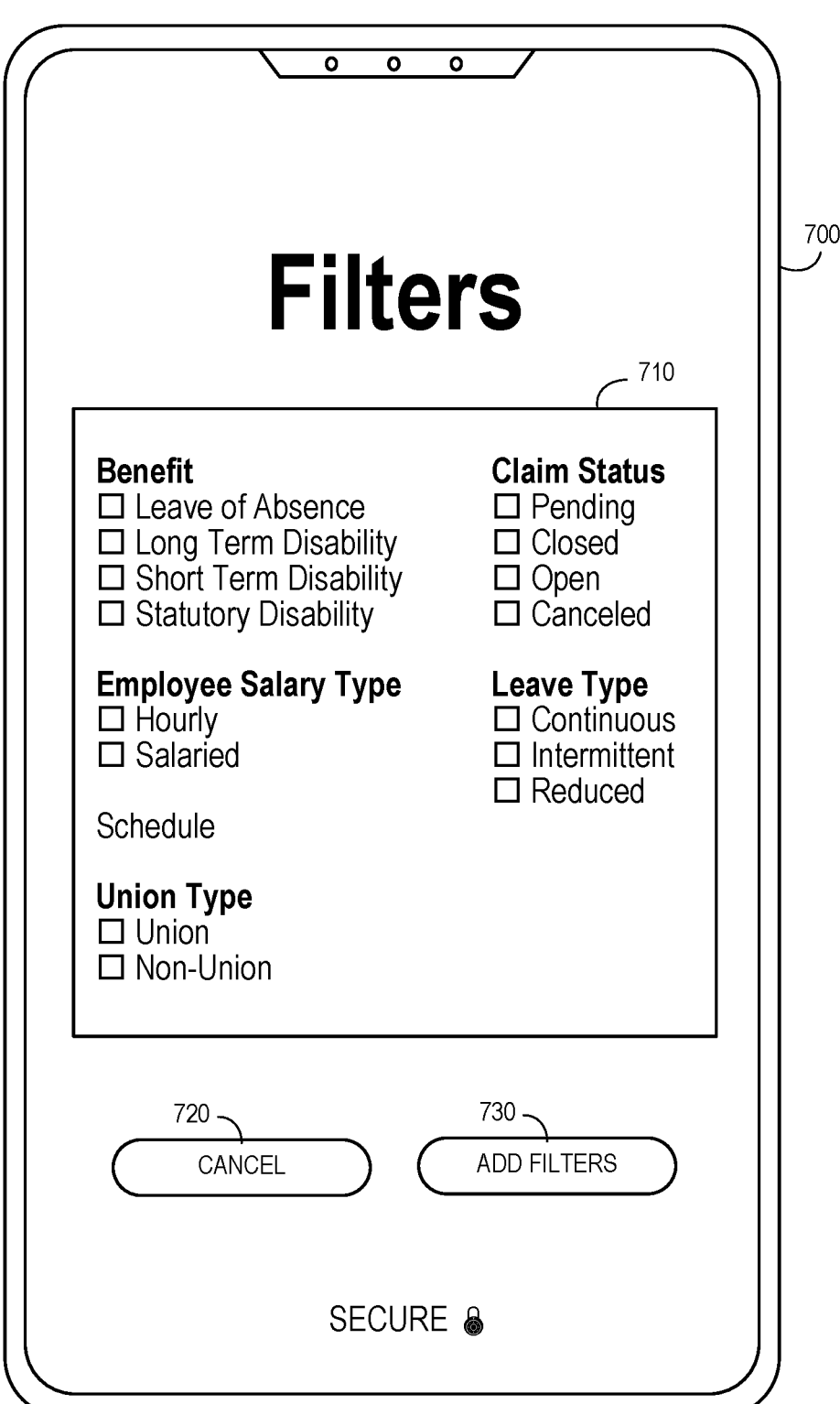
FIG. 7 is a smartphone showing absence filters according to some embodiments.
Figure 8:
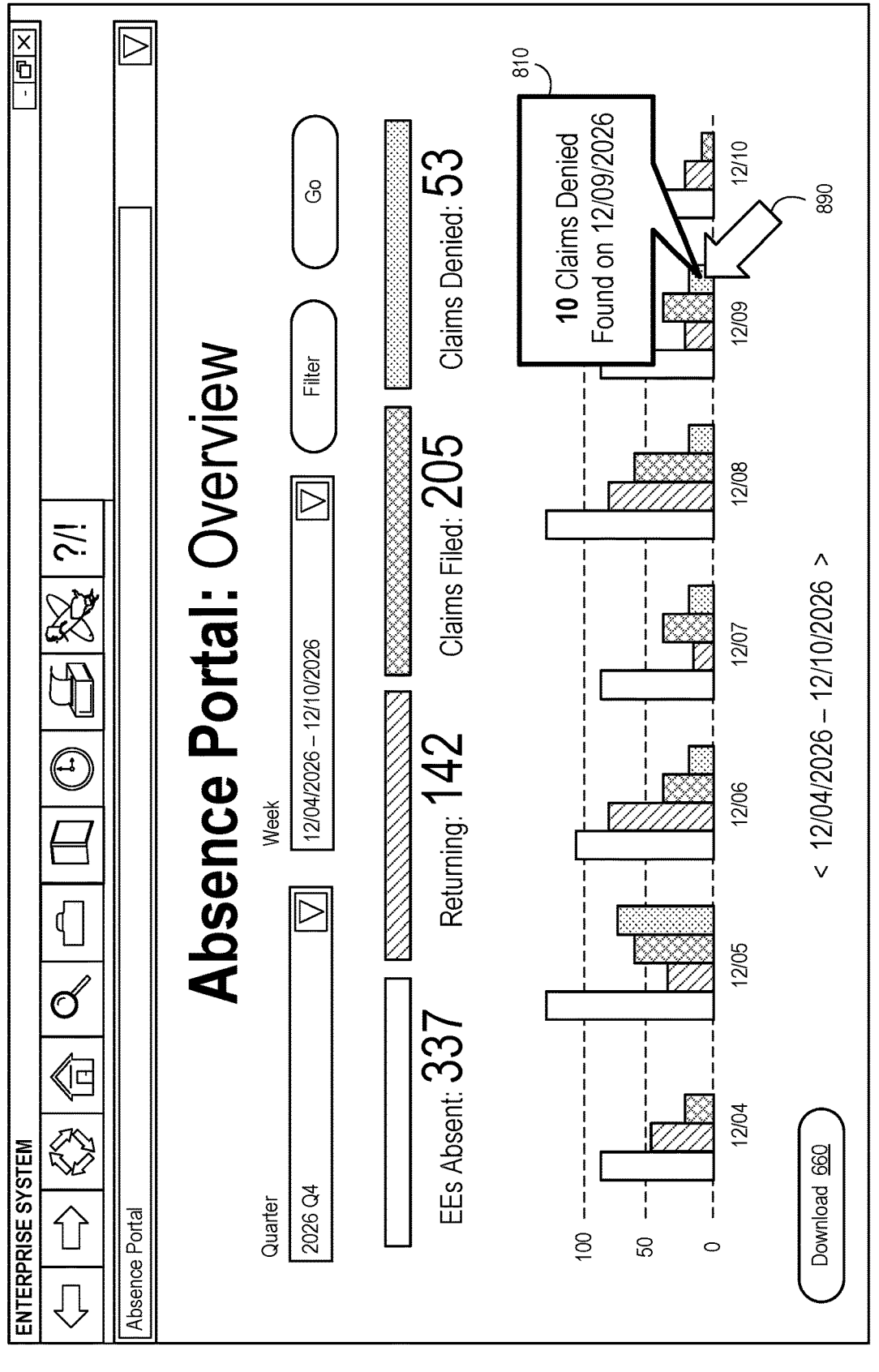
FIG. 8 illustrates a hover balloon in accordance with some embodiments.

FIG. 6 is an absence portal overview display 600 in accordance with some embodiments. The display 600 lets a user select a period of time that is of interest (e.g., a quarter 610 or particular week 620), apply filter criteria 630, an a "Go" icon 640 to update the display 600. This display 600 is an "overview" that it graphically contains information 650 about various types of absences 650 for an employer (e.g., employees who are currently absent, return to work information, new claims filed, claims that have been denied, etc.) during various time periods (e.g., seven bar charts may represent days of the week as illustrated in FIG. 6). According to some embodiments, the user can download 660 the absence information (e.g., into a spreadsheet application such as EXCEL®). Selection of the filter icon 630 lets the user see specific information about various types of absences. For example, FIG. 7 is a smartphone 700 showing absence filters 710 according to some embodiments. The filters 710 may be selectable to apply filters based on a type of benefit, a claim status, an employee salary type, a leave type, etc. The user may also cancel 720 the filters or add additional filters 730. According to some embodiments, the user may "drill down" to determine additional absence details. For example, FIG. 8 illustrates a display 800 with a hover balloon 810 in accordance with some embodiments. When the user places a computer mouse pointer 890 over an element on the display, the balloon 810 is updated with specific details about that element.

Figure 9:
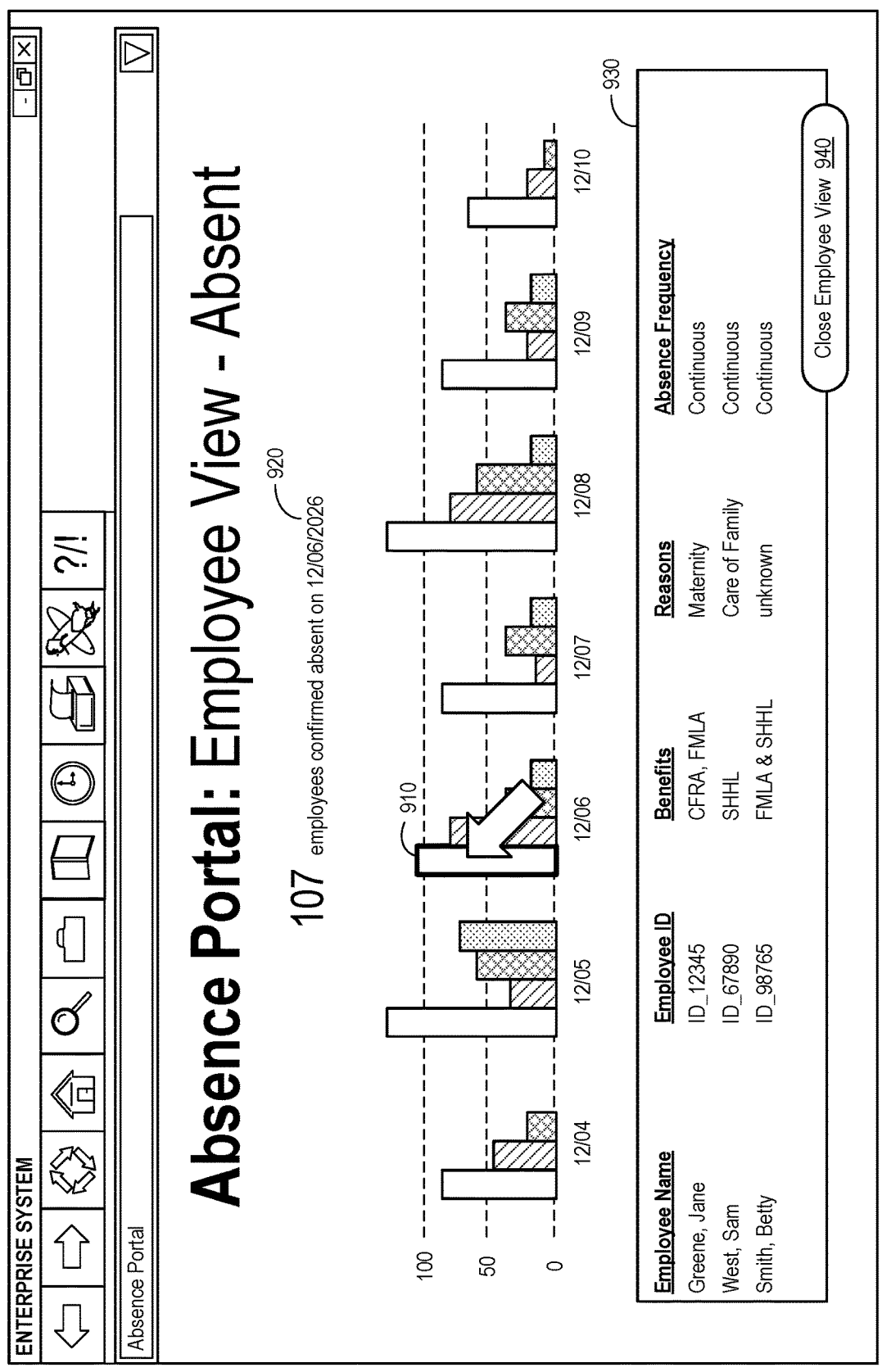
FIGS. 9 through 12 are specific overview selection displays according to some embodiments.
Figure 10:
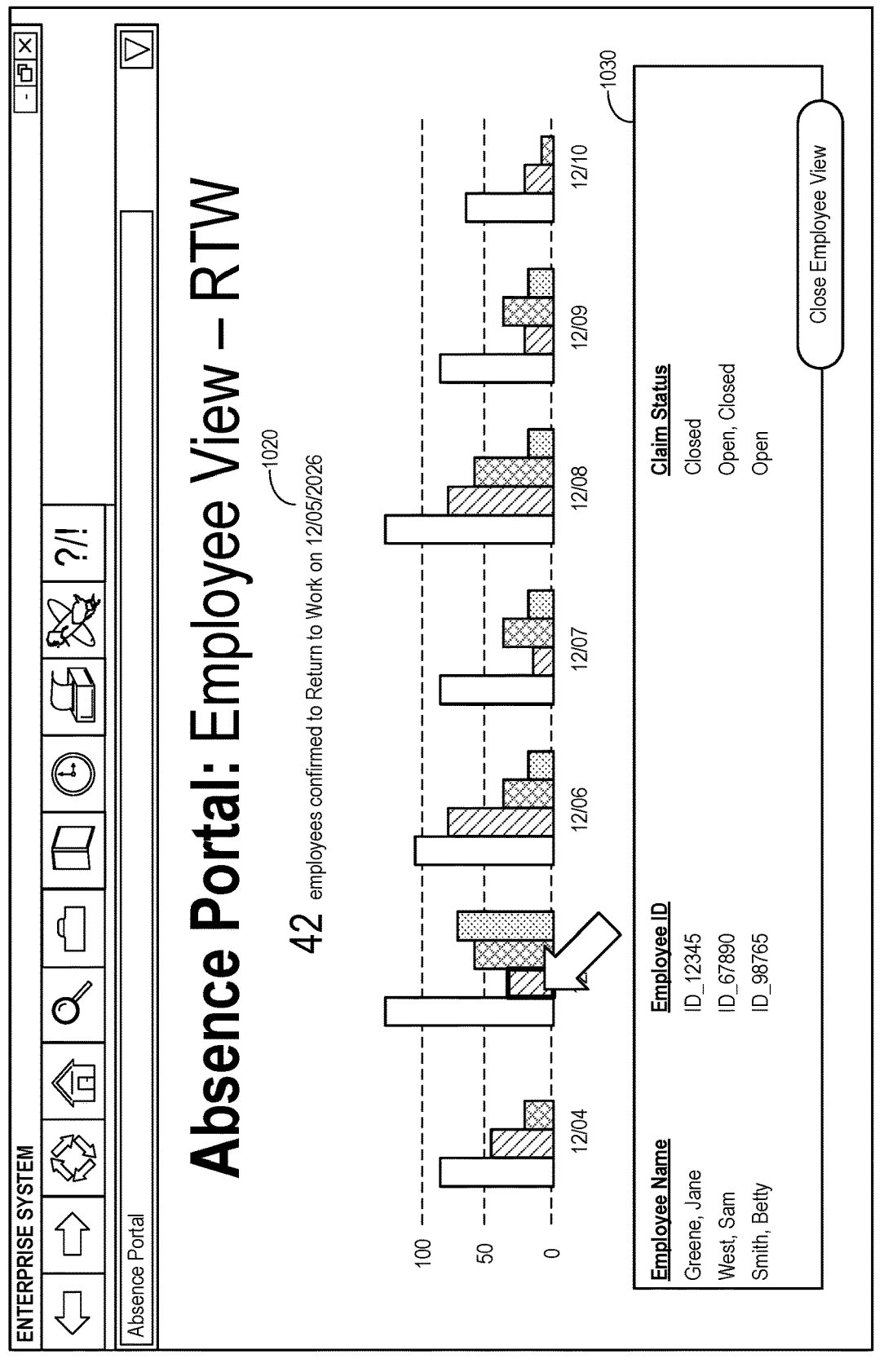
Figure 11:
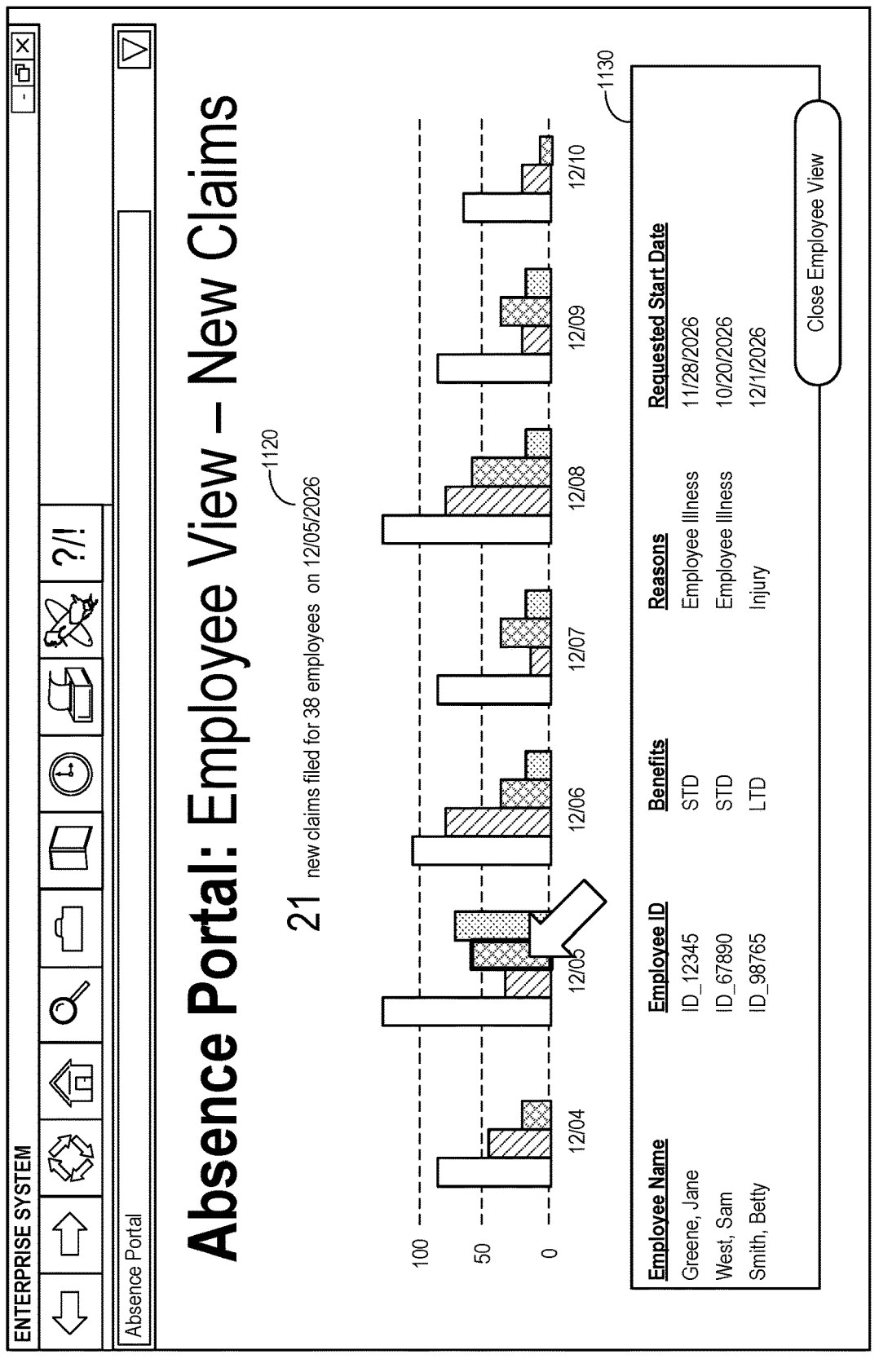
Figure 12:
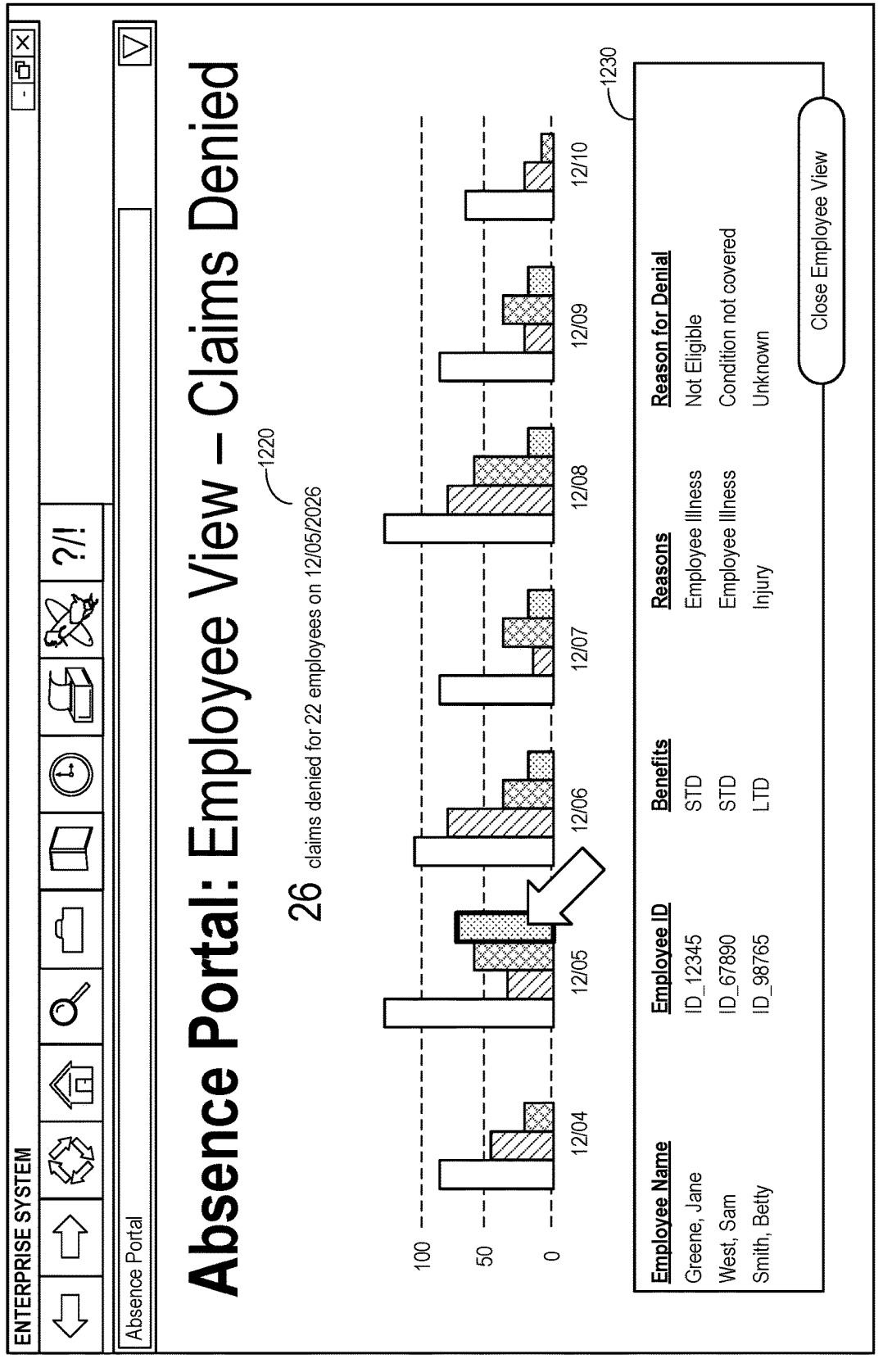

FIGS. 9 through 12 are specific overview selection displays according to some embodiments. For example, selection of "current absences" 910 in a bar chart results in a display 900 that indicates an overall number of current absences 920 along with details 930 about each employee who has a current absence as illustrated in FIG. 9. The details 930 might include, for example, an employee name, an employee identifier, a benefit, a reason, and an absence frequency (e.g., continuous or intermittent). A "Close Employee View" icon 940 might return the user to an overview display. Selection of "return to work" in a bar chart results in a display 1000 that indicates an overall number of employees who will return to work 1020 along with details 1030 about each employee as illustrated in FIG. 10. The details 1030 might include, for example, an employee name, an employee identifier, and a claim status. Selection of "new claims" in a bar chart results in a display 1100 that indicates an overall number of new claims 1120 along with details 1130 about each employee as illustrated in FIG. 11. The details 1130 might include, for example, an employee name, an employee identifier, a benefit, a reason, and a claim requested start date. Selection of "claims denied" in a bar chart results in a display 1200 that indicates an overall number of claims denied 1220 along with details 1230 about each employee as illustrated in FIG. 12. The details 1230 might include, for example, an employee name, an employee identifier, a benefit, a reason, and a reason for denial.

Figure 13:
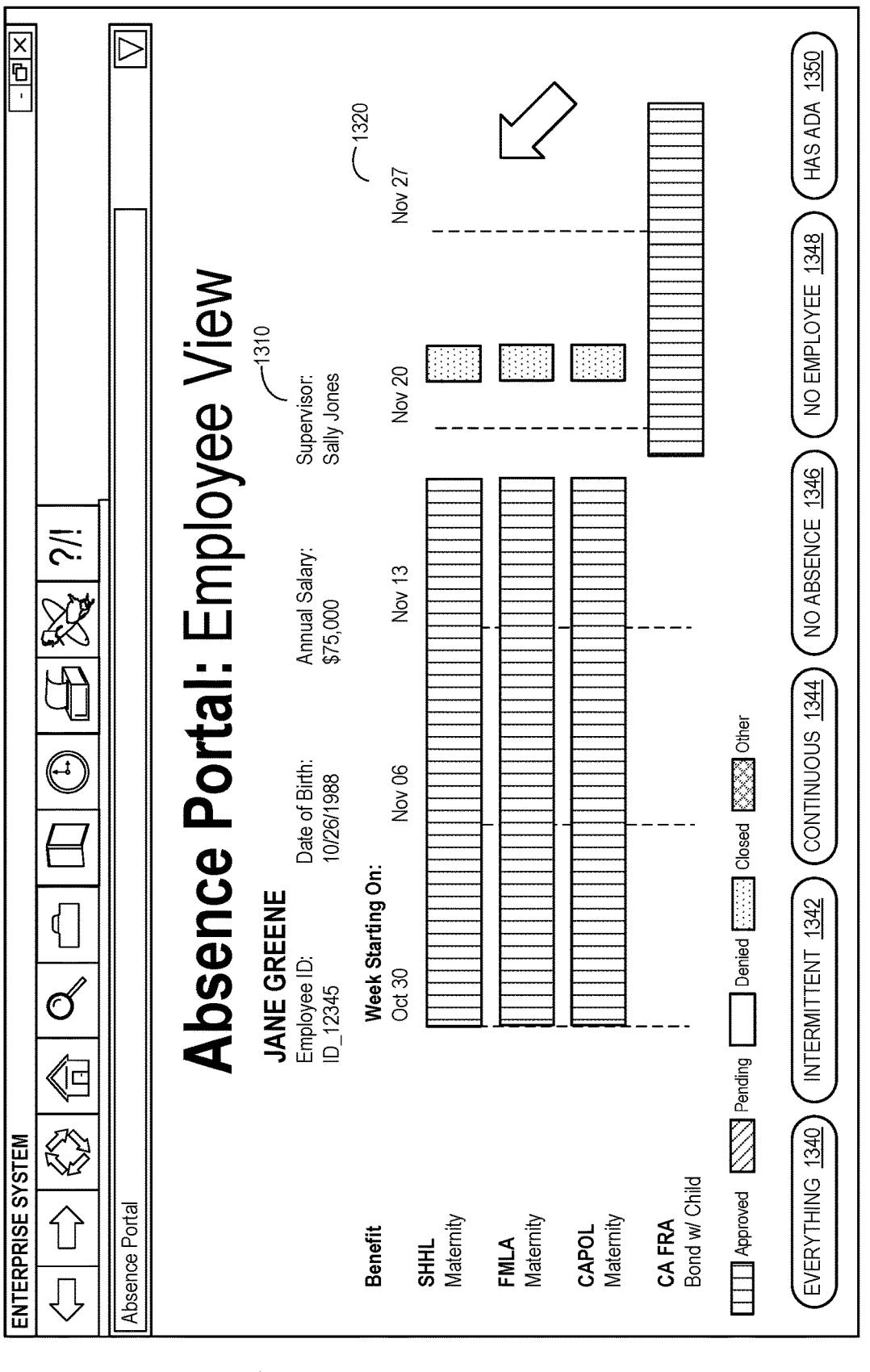
FIG. 13 is an employee specific absence portal display in accordance with some embodiments.
Figure 14:
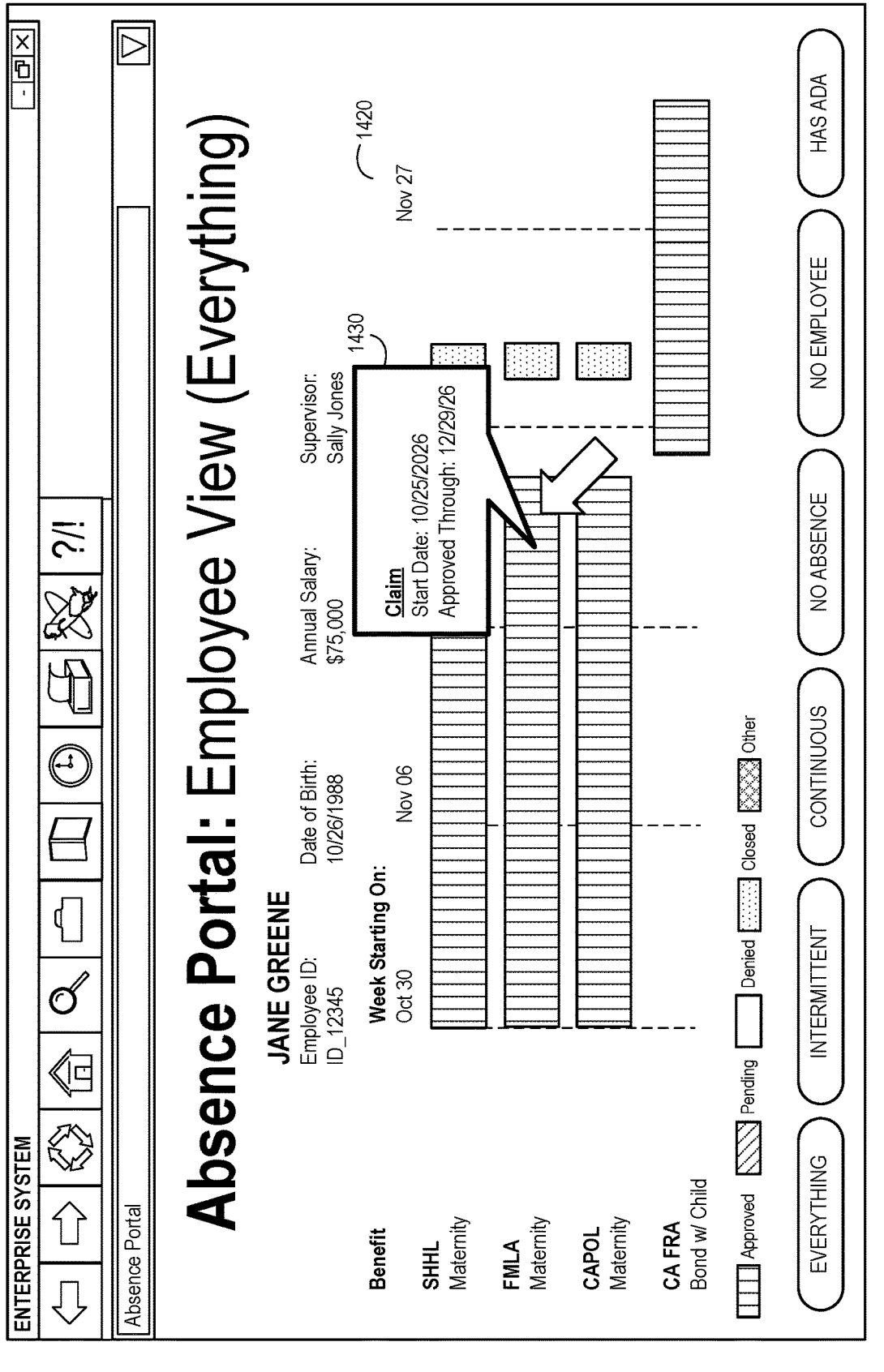
FIG. 14 illustrates a hover balloon according to some embodiments.

Selecting a particular employee in the details 1230 (e.g., "Jane Greene") might result in more specific information being provided about that specific employee. For example, FIG. 13 is an employee specific absence portal display 1300 in accordance with some embodiments. The display 1300 includes details 1310 about the employee (e.g., a name, identifier, date of birth, annual salary, supervisor, etc.) along with a graphical timeline summary 1320 of absences (e.g., including approved absences, pending absences, denied absences, closed absences, etc.). The display 1300 further includes options to let a user select to see absences that include everything 1340, intermittent 1342, continuous 1344, no absence 1346, no employee 1348, and those that are associated with the American with Disabilities Act ("ADA") 1350. Note that the options 1340, 1342, 1344, 1346, 1348, 1350 might be explicit icons included on the display 1300 or might instead be associated with various scenarios or situations, such as those that may arise when specific filters are provided by a user (e.g., as described in connection with FIG. 7). According to some embodiments, the user may "drill down" into various graphical elements to determine additional absence details. For example, FIG. 14 illustrates a display 1400 with a hover balloon 1430 in accordance with some embodiments. When the user places a computer mouse pointer over an element on a graphical timeline summary 1420, the balloon 1430 is updated with specific details about that element.

Figure 15:
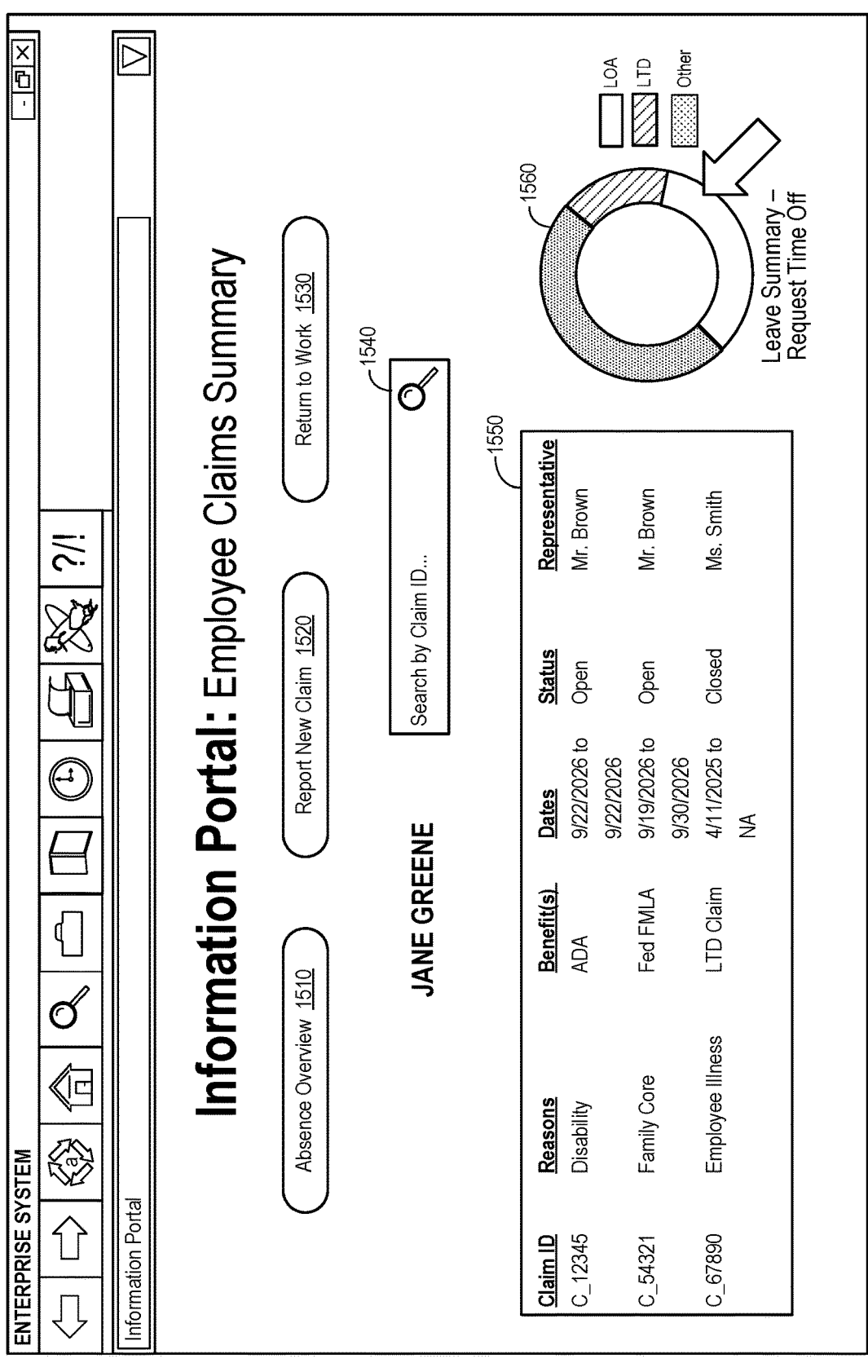
FIG. 15 is an information portal claims summary display for a specific employee in accordance with some embodiments.

FIG. 15 is an information portal claims summary display 1500 for a specific employee in accordance with some embodiments. The display 1500 may let a user return to the absence overview 1510, report a new claim 1520, view return to work data 1530, etc. The display 1500 can also be used to search for a particular claim 1540 and view a list of results 1550 (e.g., including a claim identifier, reasons, benefits, dates, status, claims representative, etc.). A leave summary graph 1560 may be used to categorize different types of leave requests.

Figure 16:
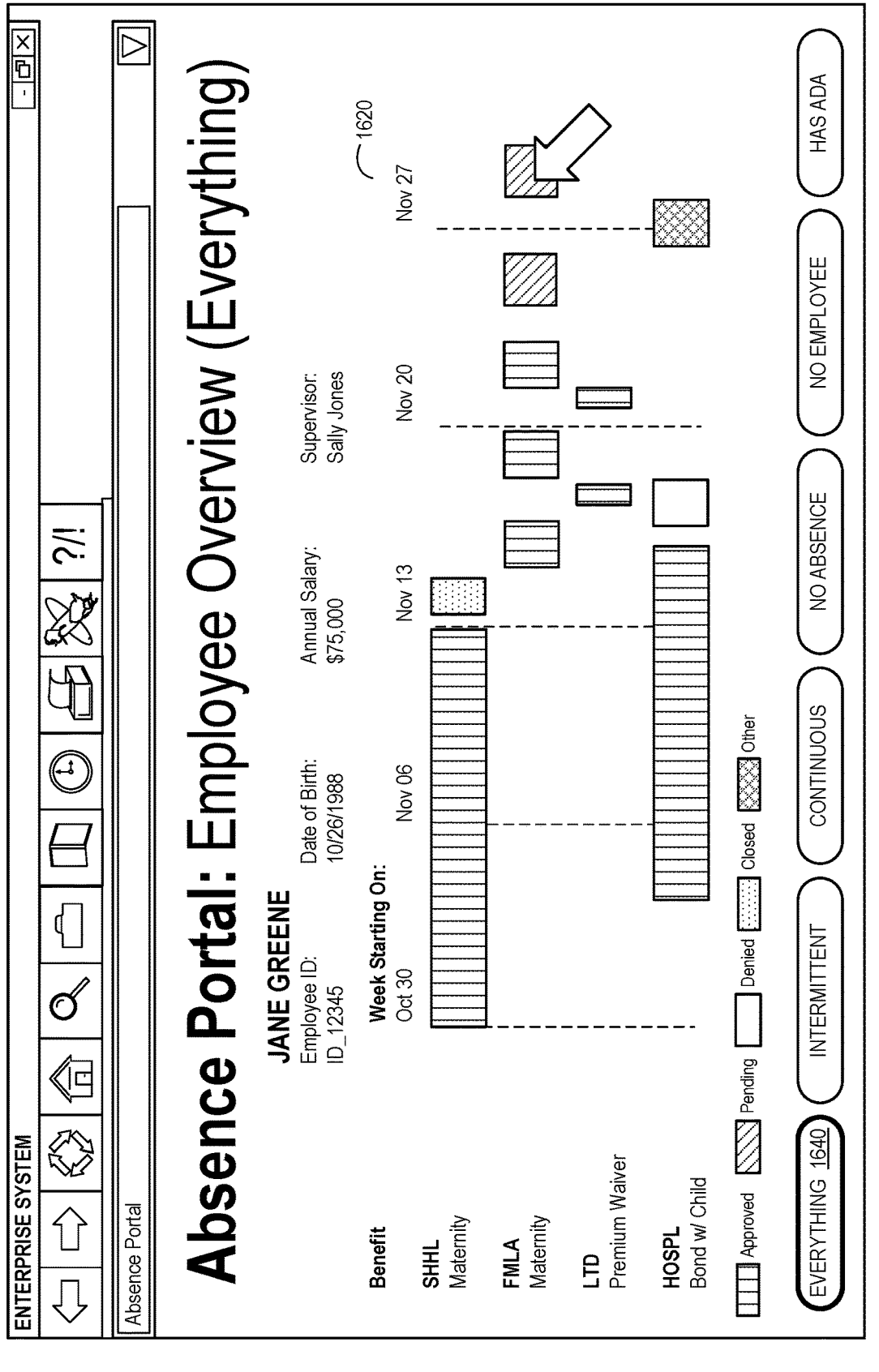
FIGS. 16 through 21 are employee specific selection displays according to some embodiments.
Figure 17:
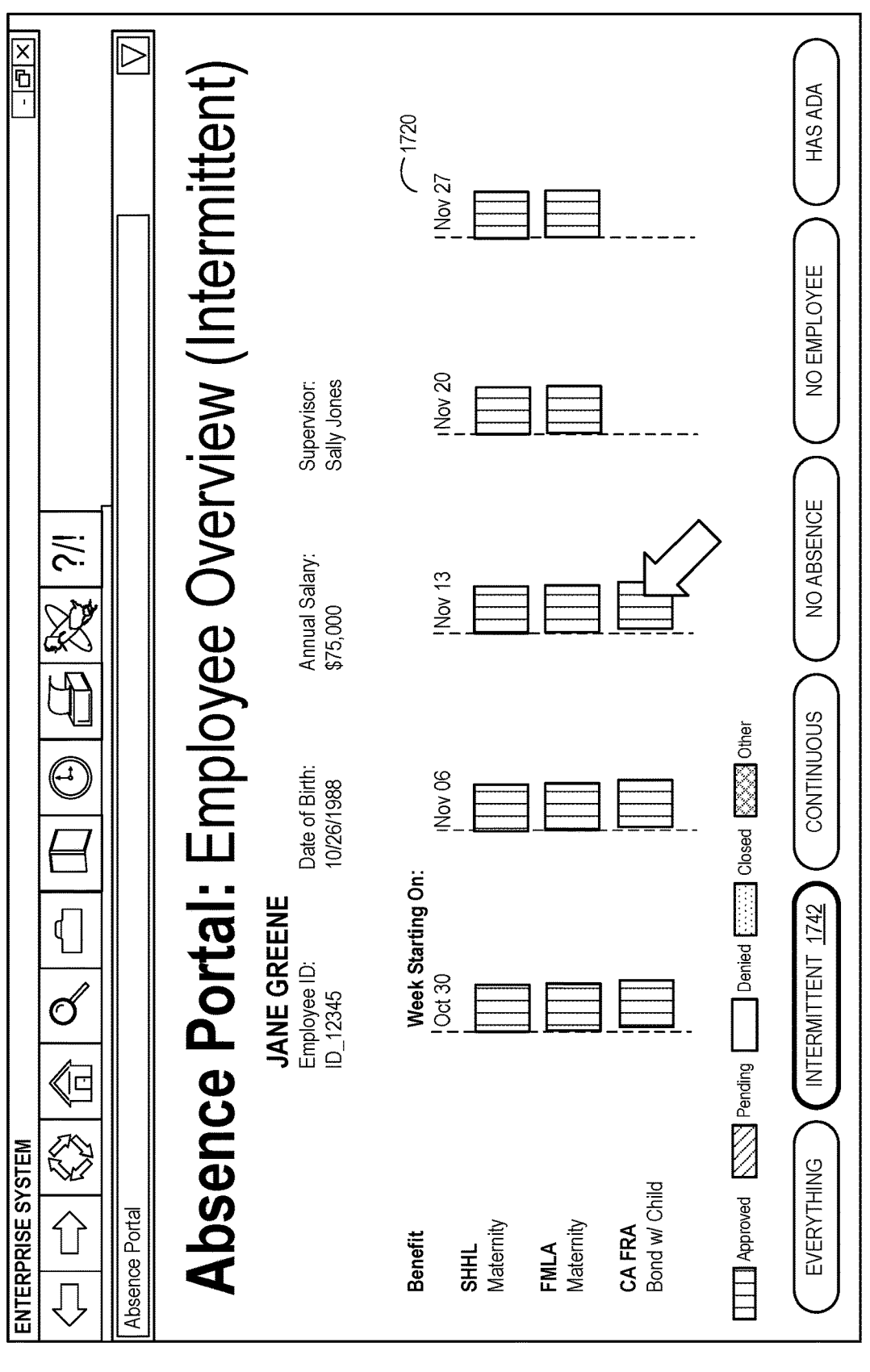
Figure 18:
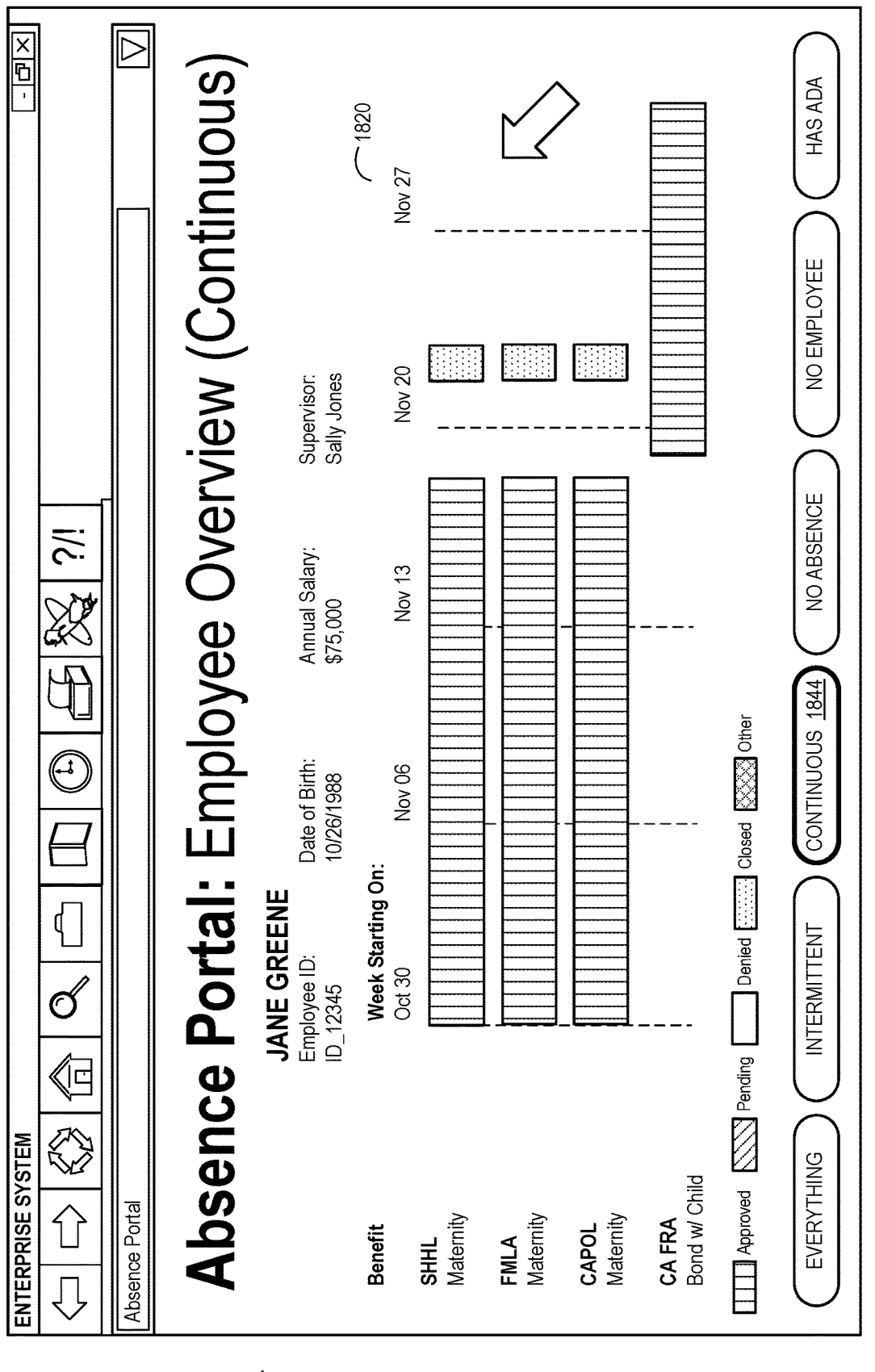
Figure 19:
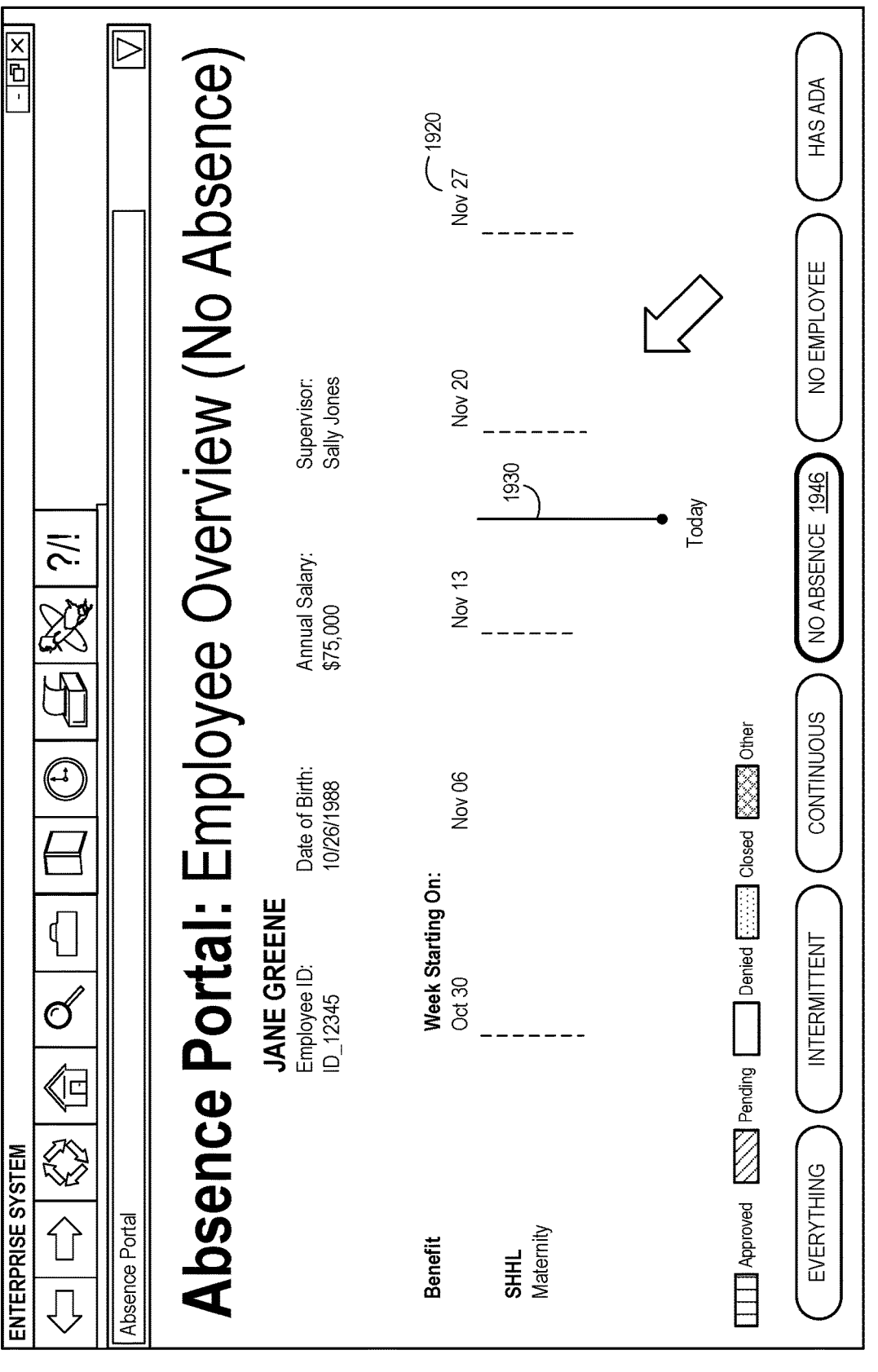
Figure 20:
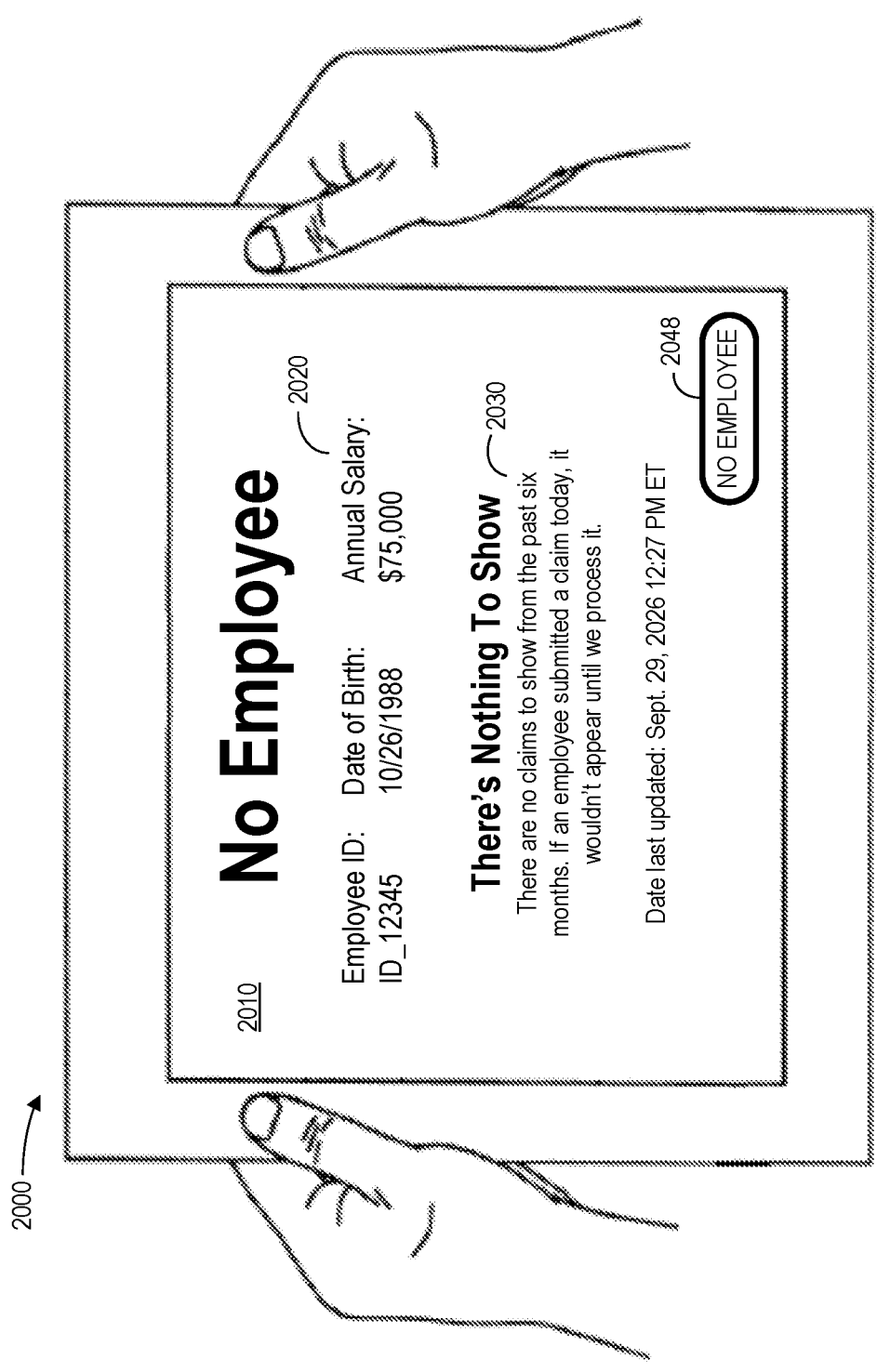
Figure 21:
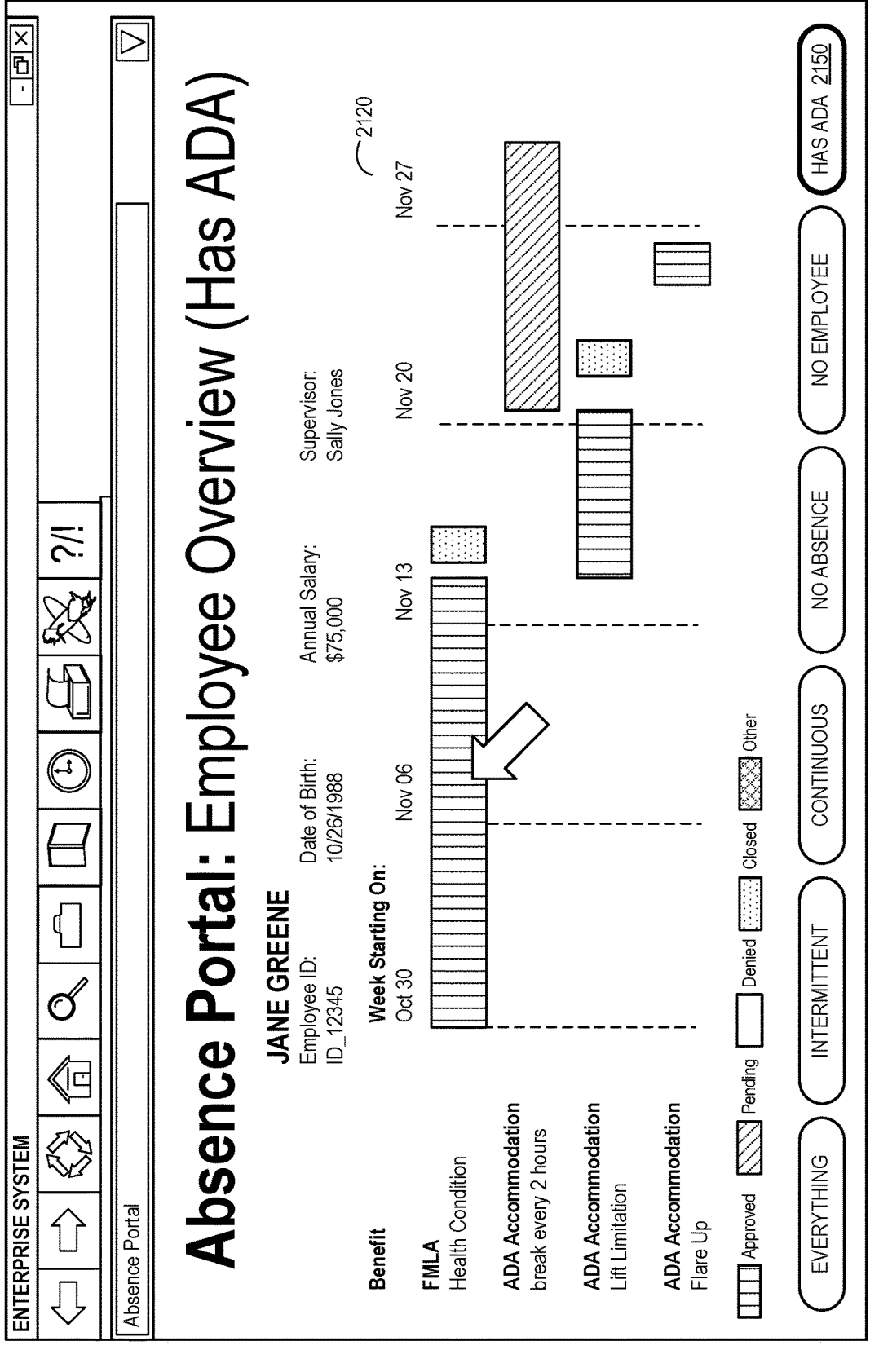

FIGS. 16 through 21 are employee specific selection displays according to some embodiments. For example, selection of an "Everything" icon 1640 may result in an employee specific "everything" display 1600 as shown in FIG. 16. The display 1600 includes a graphical timeline 1620 that shows information about all types of absences for that employee. Selection of an "Intermittent" icon 1742 may result in an employee specific "intermittent" display 1700 as shown in FIG. 17. The display 1700 includes a graphical timeline 1720 that shows information about sporadic non-continuous absences for that employee. Selection of a "Continuous" icon 1844 may result in an employee specific "continuous" display 1800 as shown in FIG. 18. The display 1800 includes a graphical timeline 1820 that shows information about sequential series of absences for that employee. Selection of a "No Absence" icon 1946 may result in an employee specific "no absence" display 1900 as shown in FIG. 19. The display 1900 includes a graphical timeline 1920 that shows information about time when no absences occurred for that employee (along with an indication of today date 1930). Selection of a "no employee" icon 2048 may result in a tablet computer 2000 providing an employee specific "no employee" display 2010 as shown in FIG. 20. The display 2010 includes employee details 2020 along with a message 2030 indication that no information was found. Selection of a "Has ADA" icon 2150 may result in an employee specific "has ADA" display 2100 as shown in FIG. 21. The display 2100 includes a graphical timeline 2120 that shows information absences for that employee that area associated with the ADA.

Figure 22:
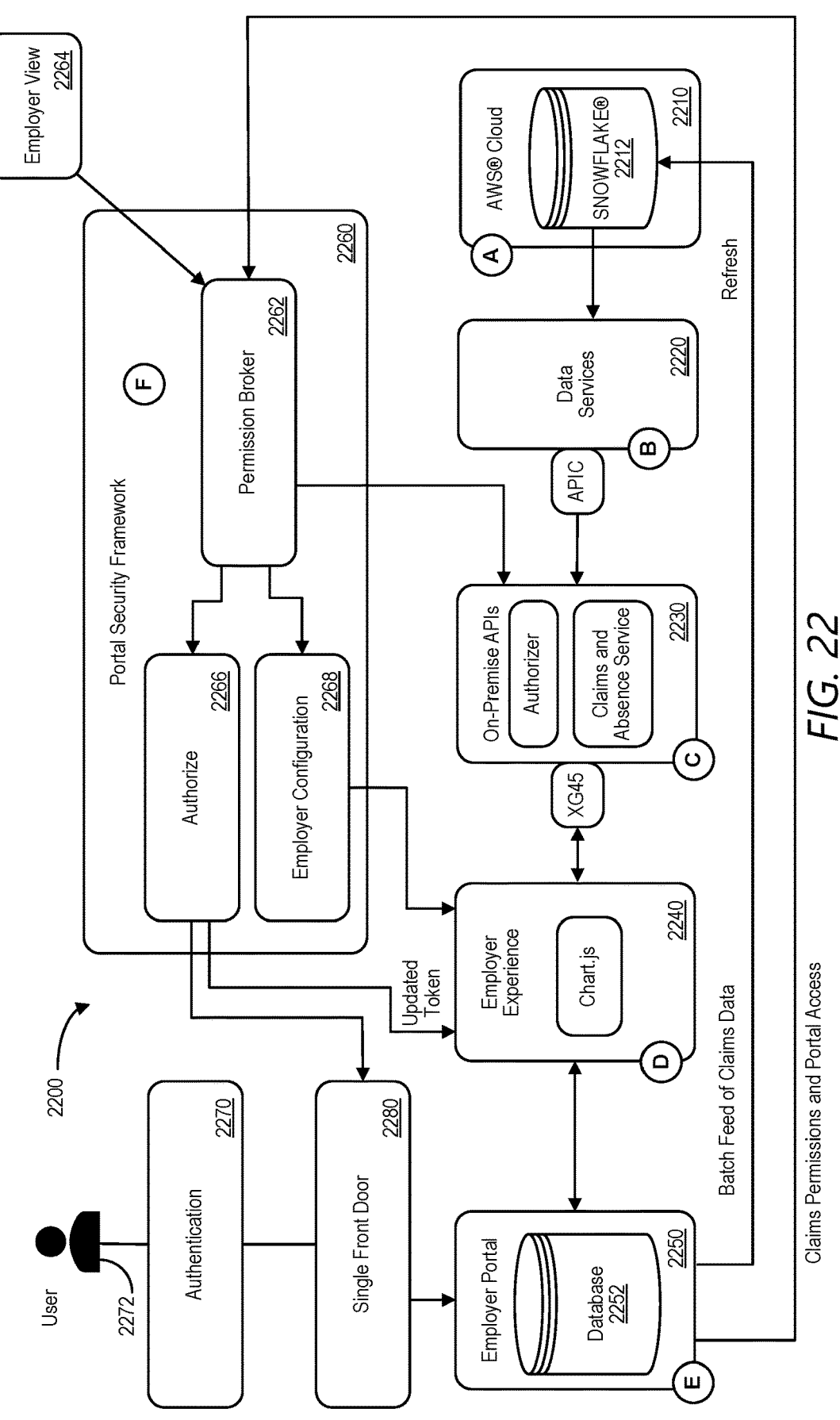
FIG. 22 is a more detailed solution architecture for a cloud-based absence tracking system in accordance with some embodiments.

FIG. 22 is a more detailed solution architecture for a cloud-based absence tracking system 2200 in accordance with some embodiments. The system 2200 may, according to some embodiments, use an opensource user interface library such as Chart.js to visualize absence data with a SNOWFLAKE® datamart 2212. In particular, claim data may be fed from an employer portal 2250 the SNOWFLAKE® datamart 2212 running on an AMAZON™ Web Services ("AWS") cloud 2210 at (A) which might, for example, be refreshed three times per day to support the requirements of an absence dashboard. The datamart 2212 data may be made available to consumers via APIs at (B) via data services 2220, an Application Policy Infrastructure Controller ("APIC"), and GraphQL. At (C), on premise APIs 2230 run an authorizer and claims and absence service to generate data for Chart.js at the employer experience platform 2240 (e.g., via a WebSphere DataPower Service Gateway such as the XG45). In some embodiments, portal experience APIs may retrieve and organize the data for user interface and enforce security access to the SNOWFLAKE® datamart 2212 information. At (D), the claims dashboards may be built by the employer experience platform 2240 using Chart.js. At (E), an employer portal 2250 with a database 2252 will be accessible only by authorized users to access claims data. At (F), a portal security framework 2260 executes authorizations 2266, employer configurations 2268, and a permission broker 2262 (and communicates with an employer view 2264) to retrieve claims permission and add access to claims functionality to a security token. A user 2272 can then access the absence portal via authentication 2270 and a single front door 2280.

Figure 23:
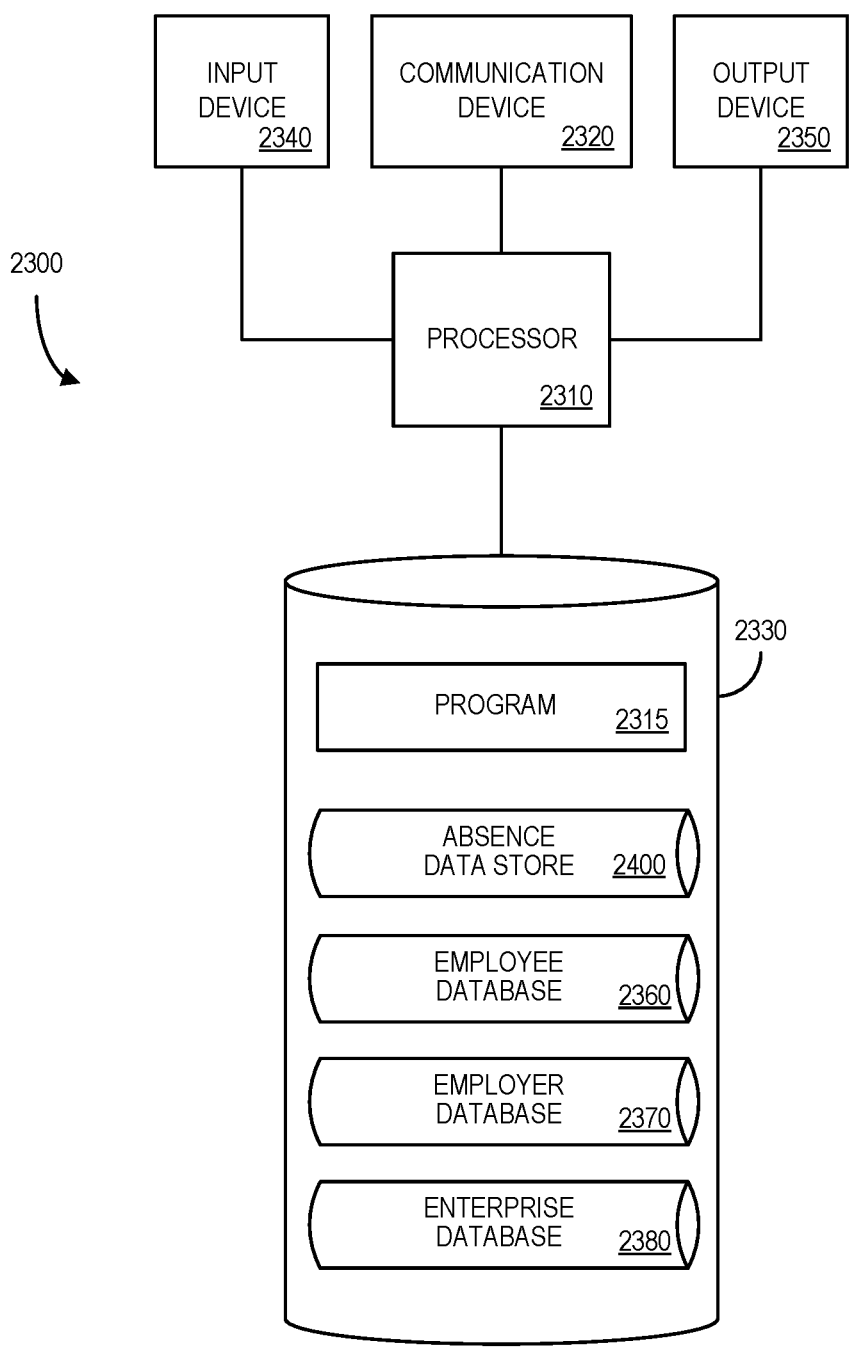
FIG. 23 is a block diagram of an apparatus in accordance with some embodiments.

The embodiments described herein may be implemented using any number of different hardware configurations. For example, FIG. 23 illustrates an apparatus 2300 that may be, for example, associated with the system 200 of FIG. 2. The apparatus 2300 comprises a processor 2310, such as one or more commercially available Central Processing Units ("CPUs") in the form of one-chip microprocessors, coupled to a communication device 2320 configured to communicate via a communication network (not shown in FIG. 23). The communication device 2320 may be used to communicate, for example, with one or more remote third-party devices, underwriting platforms, web-based tools, administrators, employers, and/or communication devices (e.g., PCs and smartphones). Note that communications exchanged via the communication device 2320 may utilize security features, such as those between a public internet user and an internal network of an insurance company and/or an enterprise. The security features might be associated with, for example, web servers, firewalls, and/or PCI infrastructure. The apparatus 2300 further includes an input device 2340 (e.g., a mouse and/or keyboard to enter information about customer absences, risk relationships or preferences, alert triggers, etc.) and an output device 2350 (e.g., to output reports regarding risk relationships, absence events, machine learning algorithms, recommendations, alerts, etc.).

The processor 2310 also communicates with a storage device 2330. The storage device 2330 may comprise any appropriate information storage device, including combinations of magnetic storage devices (e.g., a hard disk drive), optical storage devices, mobile telephones, and/or semiconductor memory devices. The storage device 2330 stores a program 2315 and/or a risk relationship tool or application for controlling the processor 2310. The processor 2310 performs instructions of the program 2315, and thereby operates in accordance with any of the embodiments described herein. For example, the processor 2310 may associate a selected absence identifier in an absence data store 2400 with an account having a risk relationship with the enterprise. The processor 2310 may then retrieve absence parameters from the absence data store 2400 and risk relationship parameters from an employee database 2360 and aggregate absence parameters associated with a plurality of absence types for the selected employee identifier. The processor 2310 may also facilitate an exchange of data with a remote device to support interactive user interface displays that include information about the aggregated absence parameters.

The program 2315 may be stored in a compressed, uncompiled and/or encrypted format. The program 2315 may furthermore include other program elements, such as an operating system, a database management system, and/or device drivers used by the processor 2310 to interface with peripheral devices.

As used herein, information may be "received" by or "transmitted" to, for example: (i) the apparatus 2300 from another device; or (ii) a software application or module within the apparatus 2300 from another software application, module, or any other source.

In some embodiments (such as shown in FIG. 23), the storage device 2330 further includes the absence data store 2400, the employee database 2360, an employer database 2370, and an enterprise database 2380. An example of a database that might be used in connection with the apparatus 2300 will now be described in detail with respect to FIG. 24. Note that the database described herein is only an example, and additional and/or different information may be stored therein. Moreover, various databases might be split or combined in accordance with any of the embodiments described herein. For example, the absence data store 2400 and enterprise database 2380 might be combined and/or linked to each other within the program 2315.

Referring to FIG. 24, a table is shown that represents the absence data store 2400 that may be stored at the apparatus 2300 according to some embodiments. The table may include, for example, entries associated with different types customer absences. The table may also define fields 2402, 2404, 2406, 2408, 2410, 2412 for each of the entries. The fields 2402, 2404, 2406, 2408, 2410, 2412 may, according to some embodiments, specify: an absence identifier 2402, an employer identifier 2404, an employee identifier 2406, a description 2408, dates 2410, and a status 2412. The absence data store 2400 may be created and updated, for example, based on information electrically received from various enterprise systems or user adjustment (e.g., including when a new absence is added or resolved) in connection with an insurer or employer.

The absence identifier 2402 may be, for example, a unique alphanumeric code identifying an absence of an employee (employee identifier 2406) of an employer (employer identifier 2404). The description 2408 may categorize the absence (STD, FMLA, ADA, etc.), and the dates 2410 may indicate when the absence occurred. The status 2412 might indicate, for example, that the absence was approved, is pending, was closed, was denied, etc.

Figure 25:
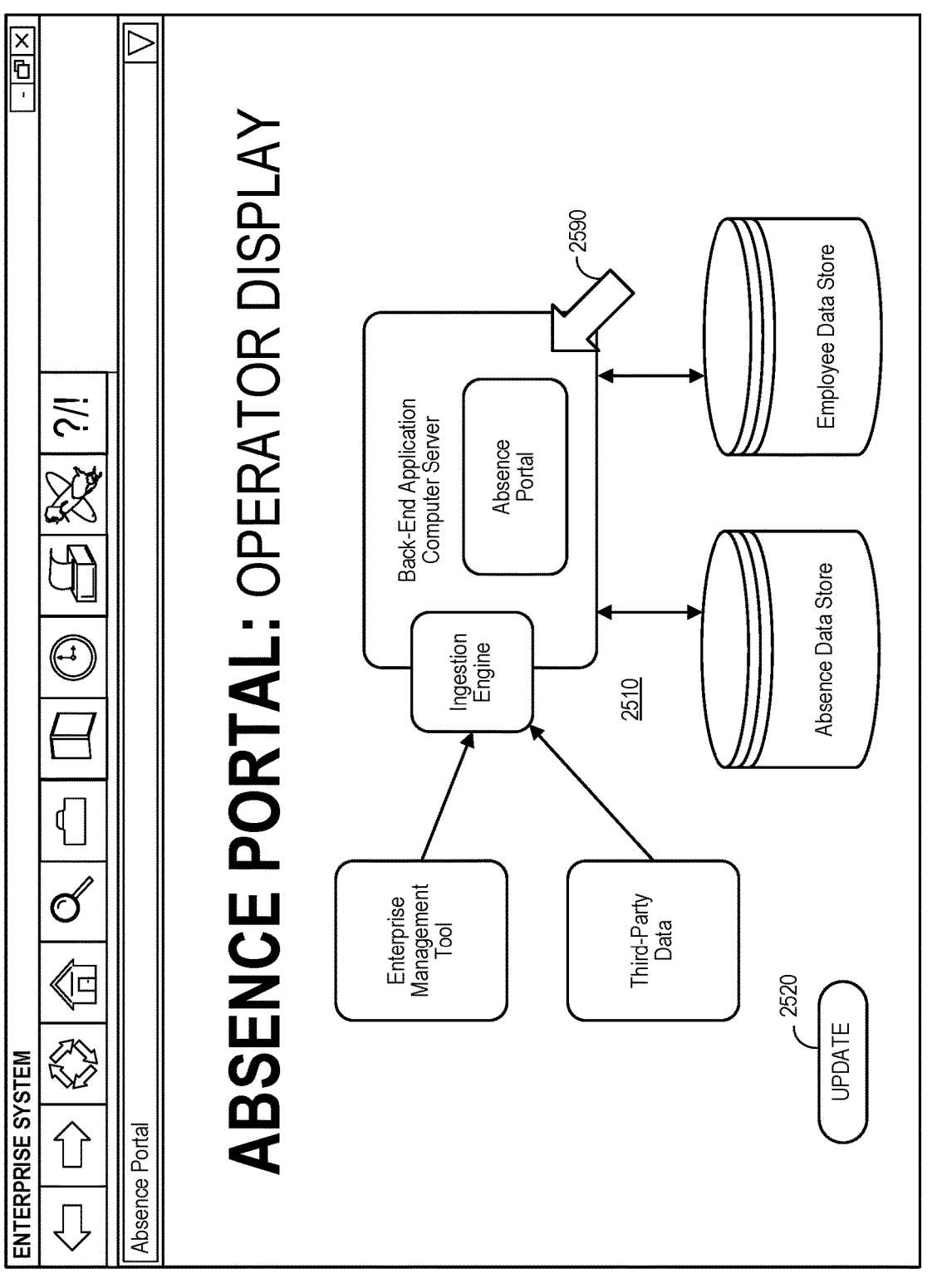
FIG. 25 is an operator or administrator display in accordance with some embodiments.

The operation of a absence portal may be controlled via a Graphical User Interface ("GUI"). For example, FIG. 25 is an absence portal operator or administrator display 2500 including graphical representations of elements 2510 of the system according to some embodiments. Selection of a portion or element of the display 2500 via a touchscreen or pointer 2590 might result in the presentation of additional information about that portion or element (e.g., a popup window presenting a data source or absence details) or let an operator or administrator enter or annotate additional information about absence details (e.g., based on his or her experience and expertise) or mappings with data stores, entity management tools, absence terminals, etc. An "Update" icon 2520 might result in an update the absence portal.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of entities and accounts, embodiments may instead be associated with other types of businesses or employee requests in additional to and/or instead of those described herein. Similarly, although certain types of insurance, businesses, and absence parameters were described in connection some embodiments herein, other types of insurance products and/or parameters might be used instead.

Thus, embodiments described herein may provide a more visual and interactive screen-based approach as compared to typical approaches, which allows the employer to quickly and deeply understand who is at work vs who is not at work versus who is going to be out. Moreover, embodiments may graphically show this info at a high level and then let a user dive into the details of an individual (mimicking an employer's online and offline activities today. Such an approach may make it relatively quick and easy to go from a 10,000 foot view to a specific individual.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. An absence tracking system implemented via a back-end application computer server of an enterprise, comprising:

(a) an absence data store that contains electronic records associated with a plurality of absence identifiers, and, for each absence identifier, an employee identifier, an absence type, and absence parameters;

(b) an employee data store that contains electronic records associated with a plurality of accounts having risk relationships with the enterprise, and, for each account, employee identifiers and risk relationship parameters;

(c) the back-end application computer server, coupled to the absence data store and the employee data store, including:

a computer processor, and a computer memory coupled to the computer processor and storing instructions that, when executed by the computer processor, cause the back-end application computer server to:

associate a selected employee identifier in the absence data store with an account having a risk relationship with the enterprise, based on the selected employee identifier, retrieve absence parameters from the absence data store and risk relationship parameters from the employee data store, and aggregate absence parameters associated with a plurality of absence types for the selected employee identifier;

(d) an on-premise Application Programming Interface (API) platform providing one or more APIs adapted to generate library data, the APIs using absence data from the absence data store;

(e) an experience platform adapted to generate one or more interactive user interface displays using the generated library data;

(f) a portal security framework executing a permission broker and communicating with an employer database view to retrieve claim permission and add access to claims functionality to a security token, wherein execution of the on-premise API platform and the experience platform are in response to authorization by the permission broker, the authorization including an updated security token; and (g) a communication port coupled to the back-end application computer server to facilitate an exchange of data with a remote device to support interactive user interface displays that include information about the aggregated absence parameters.

2. The system of claim 1, wherein the interactive user interface displays include at least one of: (i) an absence portal dashboard, (ii) an absence overview, (iii) absence filters, (iv) a return to work overview, (v) a new claim overview, and (vi) a claims denied overview.

3. The system of claim 1, wherein the interactive user interface displays include at least one of: (i) an employee view, (ii) an employee intermittent absence view, and (iii) an employee continuous absence view.

4. The system of claim 1, wherein the absence parameters include an absence status associated with at least one of: (i) approved, (ii) pending, (iii) denied, and (iv) closed.

5. The system of claim 1, wherein the absence types include at least one of: (i) Short Term Disability ("STD"), (ii) Long Term Disability ("LTD"), and (iii) paid family leave.

6. The system of claim 1, wherein the absence parameters include at least one of: (i) absence dates, (ii) an employee name, (iii) an employee gender, (iv) a date of birth, (v) a date of hire, (vi) an employee status, (vii) an expected return to work date, (viii) an intake method, (ix) a work state, (x) a date reported, (xi) a date of disability, (xii) a modified duty flag, and (xiii) a percent of benefit used value.

7. The system of claim 1, wherein the enterprise is an insurer, the accounts are associated with businesses, and the risk relationships are associated with insurance policies.

8. The system of claim 7, wherein the back-end application computer server is further configured to aggregate absence parameters associated with a plurality of employee identifiers.

9. The system of claim 1, wherein the absence parameters include a communication address and the back-end application computer server is further to automatically create and transmit a notification to the communication address.

10. The system of claim 9, wherein the communication address is associated with at least one of: (i) an email address, (ii) a telephone number, (iii) a user name and password, and (iv) a postal address.

11. An absence tracking method implemented via a back-end application computer server of an enterprise, comprising:

associating, by a computer processor of a back-end application computer server, a selected employee identifier in an absence data store with an account having a risk relationship with the enterprise, wherein the absence data store contains electronic records associated with a plurality of absence identifiers, and, for each absence identifier, an employee identifier, an absence type, and absence parameters;

based on the selected employee identifier, retrieving absence parameters from the absence data store and risk relationship parameters from an employee data store, wherein the employee data store contains electronic records associated with a plurality of accounts having risk relationships with the enterprise, and, for each account, employee identifiers and risk relationship parameters;

aggregating absence parameters associated with a plurality of absence types for the selected employee identifier;

generating library data using one or more Application Programming Interfaces (APIs) provided by an on-premise API platform, the APIs using absence data from the absence data store;

generating, by an experience platform, one or more interactive user interface displays using the generated library data;

executing, by a portal security framework, a permission broker and communicating with an employer database view to retrieve claim permission and add access to claims functionality to a security token, wherein execution of the on-premise API platform and the experience platform are in response to authorization by the permission broker, the authorization including an updated security token; and exchanging data with a remote device to support interactive user interface displays that include information about the aggregated absence parameters.

12. The method of claim 11, wherein the interactive user interface displays include at least one of: (i) an absence portal dashboard, (ii) an absence overview, (iii) absence filters, (iv) a return to work overview, (v) a new claim overview, and (vi) a claims denied overview.

13. The method of claim 11, wherein the interactive user interface displays include at least one of: (i) an employee view, (ii) an employee intermittent absence view, and (iii) an employee continuous absence view.

14. The method of claim 11, wherein the absence parameters include an absence status associated with at least one of: (i) approved, (ii) pending, (iii) denied, and (iv) closed.

15. The method of claim 11, wherein the absence types include at least one of: (i) Short Term Disability ("STD"), (ii) Long Term Disability ("LTD"), and (iii) paid family leave.

16. The method of claim 11, wherein the absence parameters include at least one of: (i) absence dates, (ii) an employee name, (iii) an employee gender, (iv) a date of birth, (v) a date of hire, (vi) an employee status, (vii) an expected return to work date, (viii) an intake method, (ix) a work state, (x) a date reported, (xi) a date of disability, (xii) a modified duty flag, and (xiii) a percent of benefit used value.

17. A non-transitory, computer-readable medium storing instructions, that, when executed by a processor, cause the processor to perform an absence tracking method implemented via a back-end application computer server of an enterprise, the method comprising:

associating, by a computer processor of a back-end application computer server, a selected employee identifier in an absence data store with an account having a risk relationship with the enterprise, wherein the absence data store contains electronic records associated with a plurality of absence identifiers, and, for each absence identifier, an employee identifier, an absence type, and absence parameters;

based on the selected employee identifier, retrieving absence parameters from the absence data store and risk relationship parameters from an employee data store, wherein the employee data store contains electronic records associated with a plurality of accounts having risk relationships with the enterprise, and, for each account, employee identifiers and risk relationship parameters;

aggregating absence parameters associated with a plurality of absence types for the selected employee identifier;

generating library data using one or more Application Programming Interfaces (APIs) provided by an on-premise API platform, the APIs using absence data from the absence data store;

generating, by an experience platform, one or more interactive user interface displays using the generated library data;

executing, by a portal security framework, a permission broker and communicating with an employer database view to retrieve claim permission and add access to claims functionality to a security token, wherein execution of the on-premise API platform and the experience platform are in response to authorization by the permission broker, the authorization including an updated security token; and exchanging data with a remote device to support interactive user interface displays that include information about the aggregated absence parameters.

18. The medium of claim 17, wherein the enterprise is an insurer, the accounts are associated with businesses, and the risk relationships are associated with insurance policies.

19. The medium of claim 18, wherein the back-end application computer server is further configured to aggregate absence parameters associated with a plurality of employee identifiers.

20. The medium of claim 17, wherein the absence parameters include a communication address and the back-end application computer server is further to automatically create and transmit a notification to the communication address.

21. The medium of claim 20, wherein the communication address is associated with at least one of: (i) an email address, (ii) a telephone number, (iii) a user name and password, and (iv) a postal address.

\* \* \* \* \*